(12) United States Patent
Freeman

(10) Patent No.: US 10,100,524 B2
(45) Date of Patent: *Oct. 16, 2018

(54) PROTECTED MEMBRANE ROOF SYSTEM

(71) Applicant: Thurman W. Freeman, Newark, OH (US)

(72) Inventor: Thurman W. Freeman, Newark, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/450,149

(22) Filed: Mar. 6, 2017

(65) Prior Publication Data

US 2017/0175395 A1    Jun. 22, 2017

Related U.S. Application Data

(63) Continuation-in-part of application No. 14/775,275, filed as application No. PCT/US2014/024763 on Mar. 12, 2014, now Pat. No. 9,587,402, which is a continuation of application No. 13/798,810, filed on Mar. 13, 2013, now Pat. No. 8,863,442.

(51) Int. Cl.
| | |
|---|---|
| *E04B 7/00* | (2006.01) |
| *E04D 15/04* | (2006.01) |
| *E04D 11/02* | (2006.01) |
| *E04D 13/00* | (2006.01) |
| *E04D 11/00* | (2006.01) |

(52) U.S. Cl.
CPC .......... *E04D 15/04* (2013.01); *E04D 11/002* (2013.01); *E04D 11/02* (2013.01); *E04D 13/00* (2013.01)

(58) Field of Classification Search
CPC ....... E04D 15/04; E04D 11/002; E04D 11/02; E04D 13/00

USPC ................................................ 52/3, 23, 408
See application file for complete search history.

(56) References Cited

U.S. PATENT DOCUMENTS

| | | | | |
|---|---|---|---|---|
| 3,135,069 | A * | 6/1964 | Schuller | E04D 5/12 428/139 |
| 3,343,227 | A * | 9/1967 | Brown | E04F 13/0801 29/432 |
| 4,235,058 | A * | 11/1980 | Patry | E04D 11/02 52/408 |
| 4,441,295 | A * | 4/1984 | Kelly | E04D 3/3603 52/309.8 |

(Continued)

*Primary Examiner* — Basil S Katcheves
*Assistant Examiner* — Joshua K Ihezie
(74) *Attorney, Agent, or Firm* — Lodestone Legal Group; Jeromye V. Sartain

(57) ABSTRACT

A protected membrane roof system for installation on a roof decking comprising an upper insulation board having an upwardly-facing upper board top surface and an opposite downwardly-facing upper board bottom surface and at least one through-hole communicating therebetween, a ballast material positioned over the upper insulation board, and at least one fastener assembly having a base seated substantially adjacent the upper board bottom surface, a rod extending substantially vertically from the base of sufficient size so as to extend through the through-hole of the upper insulation board and the ballast material, and a cap engaged with the rod above the ballast material, whereby the wind uplift resistance of the protected membrane roof system is improved and scour of the ballast material is reduced by effectively anchoring the ballast material to the upper insulation board beneath the ballast material.

18 Claims, 23 Drawing Sheets

(56) References Cited

U.S. PATENT DOCUMENTS

| | | | | | |
|---|---|---|---|---|---|
| 4,546,580 A | * | 10/1985 | Ueno | ............... | E04D 11/005 52/126.1 |
| 4,557,081 A | * | 12/1985 | Kelly | ............... | E04D 5/14 52/199 |
| 4,616,455 A | * | 10/1986 | Hewison | ............... | E04D 3/3603 411/383 |
| 4,649,686 A | * | 3/1987 | Backenstow | ............... | E04D 5/143 52/410 |
| 4,663,909 A | * | 5/1987 | Ogino | ............... | E04D 11/00 454/185 |
| 4,669,246 A | * | 6/1987 | Freeman | ............... | E04D 11/02 52/309.8 |
| 4,677,800 A | * | 7/1987 | Roodvoets | ............... | E04D 11/02 52/199 |
| 4,706,432 A | * | 11/1987 | Fishburn | ............... | E04D 5/142 277/654 |
| 4,712,349 A | * | 12/1987 | Riley | ............... | E04D 11/02 52/199 |
| 4,719,723 A | * | 1/1988 | Van Wagoner | ............... | E04D 11/02 52/15 |
| 4,727,699 A | * | 3/1988 | Sargent | ............... | E04D 5/143 24/459 |
| 4,739,599 A | * | 4/1988 | Lopez | ............... | E04D 3/3603 52/410 |
| 4,783,942 A | * | 11/1988 | Nunley | ............... | E04D 11/02 52/309.1 |
| 4,870,796 A | * | 10/1989 | Hart | ............... | E04D 7/00 52/309.8 |
| 4,888,930 A | * | 12/1989 | Kelly | ............... | E04D 3/3601 52/309.8 |
| 4,899,514 A | * | 2/1990 | Brookhart, Jr. | ............... | E04D 3/04 52/535 |
| 4,924,174 A | * | 5/1990 | Sheahan | ............... | E04D 3/3608 324/696 |
| 5,144,782 A | * | 9/1992 | Paquette | ............... | E04D 11/02 52/14 |
| 5,193,326 A | * | 3/1993 | Sheahan | ............... | E04D 3/3601 52/698 |
| 5,212,927 A | * | 5/1993 | Sheahan | ............... | E04D 13/006 411/381 |
| 5,347,768 A | * | 9/1994 | Pineda | ............... | E04B 7/02 52/23 |
| 5,579,619 A | * | 12/1996 | Godschalx | ............... | E04D 5/12 52/409 |
| 5,784,845 A | * | 7/1998 | Imeokparia | ............... | E04D 11/02 52/309.6 |
| 5,907,938 A | * | 6/1999 | Sheahan | ............... | E04D 3/3603 411/531 |
| 5,979,133 A | * | 11/1999 | Funkhouser | ............... | E04D 5/10 428/353 |
| 6,179,538 B1 | * | 1/2001 | Palm | ............... | E04D 3/3603 411/1 |
| 7,334,376 B1 | * | 2/2008 | Behrens | ............... | E04D 11/002 52/746.11 |
| 7,638,054 B1 | * | 12/2009 | Jensen | ............... | C02F 3/32 210/259 |
| 8,863,442 B2 | * | 10/2014 | Freeman | ............... | E04D 5/145 52/23 |
| 2006/0070299 A1 | * | 4/2006 | Furumura | ............... | A01G 9/02 47/69 |
| 2006/0174585 A1 | * | 8/2006 | Barr | ............... | B32B 7/12 52/741.3 |
| 2007/0094971 A1 | * | 5/2007 | Kern | ............... | F17C 3/022 52/404.1 |
| 2010/0031603 A1 | * | 2/2010 | Letts | ............... | B32B 27/40 52/745.06 |
| 2010/0126066 A1 | * | 5/2010 | DeVos | ............... | E04D 11/002 47/65.9 |
| 2010/0325975 A1 | * | 12/2010 | Mischo | ............... | E04D 7/005 52/173.3 |
| 2011/0113702 A1 | * | 5/2011 | Hasan | ............... | E04D 11/002 52/173.1 |
| 2011/0197504 A1 | * | 8/2011 | Hellwig | ............... | B32B 5/022 47/64 |
| 2012/0311951 A1 | * | 12/2012 | Letts | ............... | E04D 3/3603 52/483.1 |
| 2013/0333285 A1 | * | 12/2013 | Buist | ............... | A01G 9/033 47/65.9 |
| 2014/0259972 A1 | * | 9/2014 | Feuer | ............... | E04D 7/00 52/58 |
| 2017/0362780 A1 | * | 12/2017 | Cooley | ............... | E01C 13/08 |

* cited by examiner

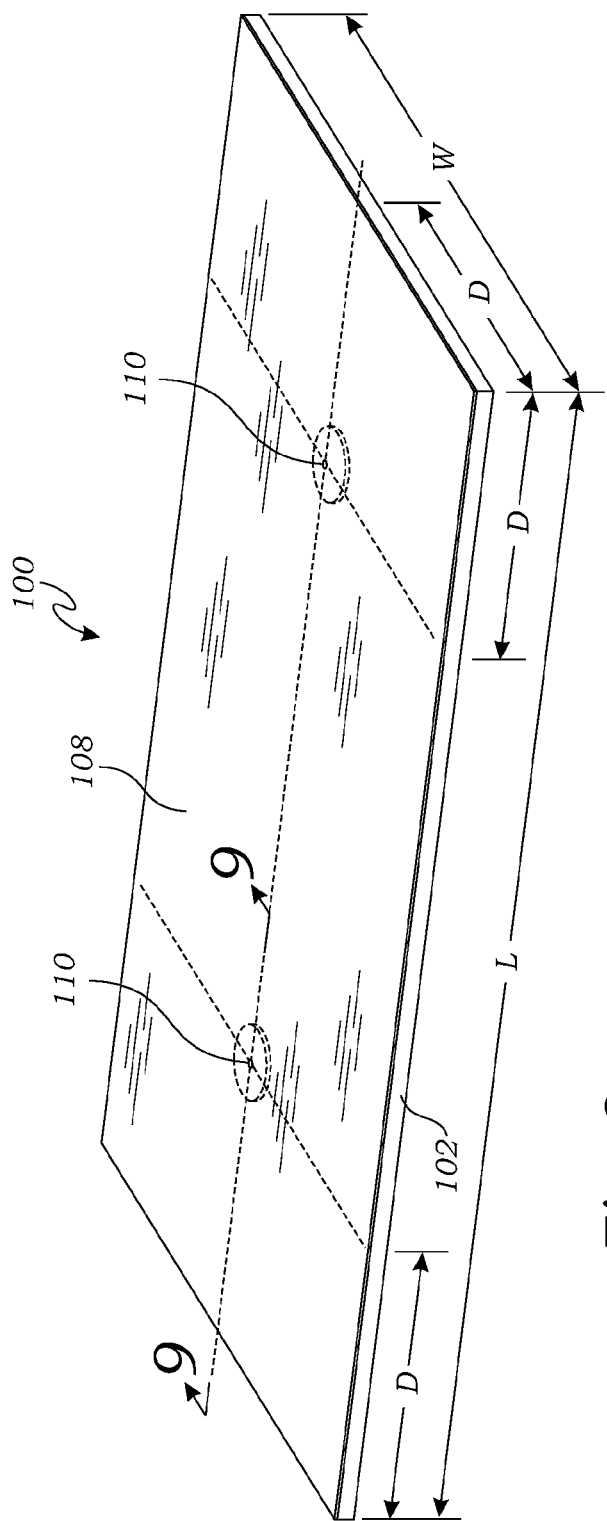
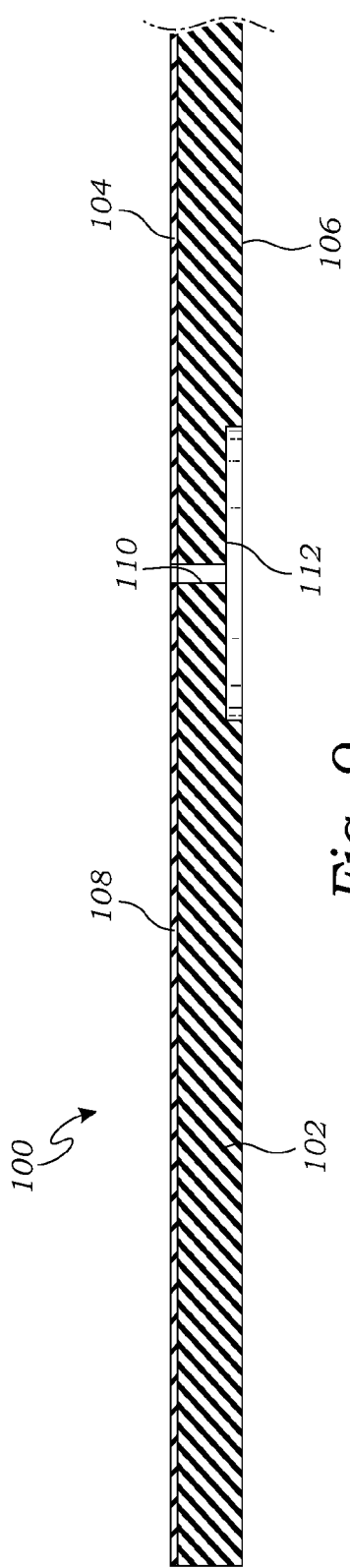
Fig. 8
Fig. 9

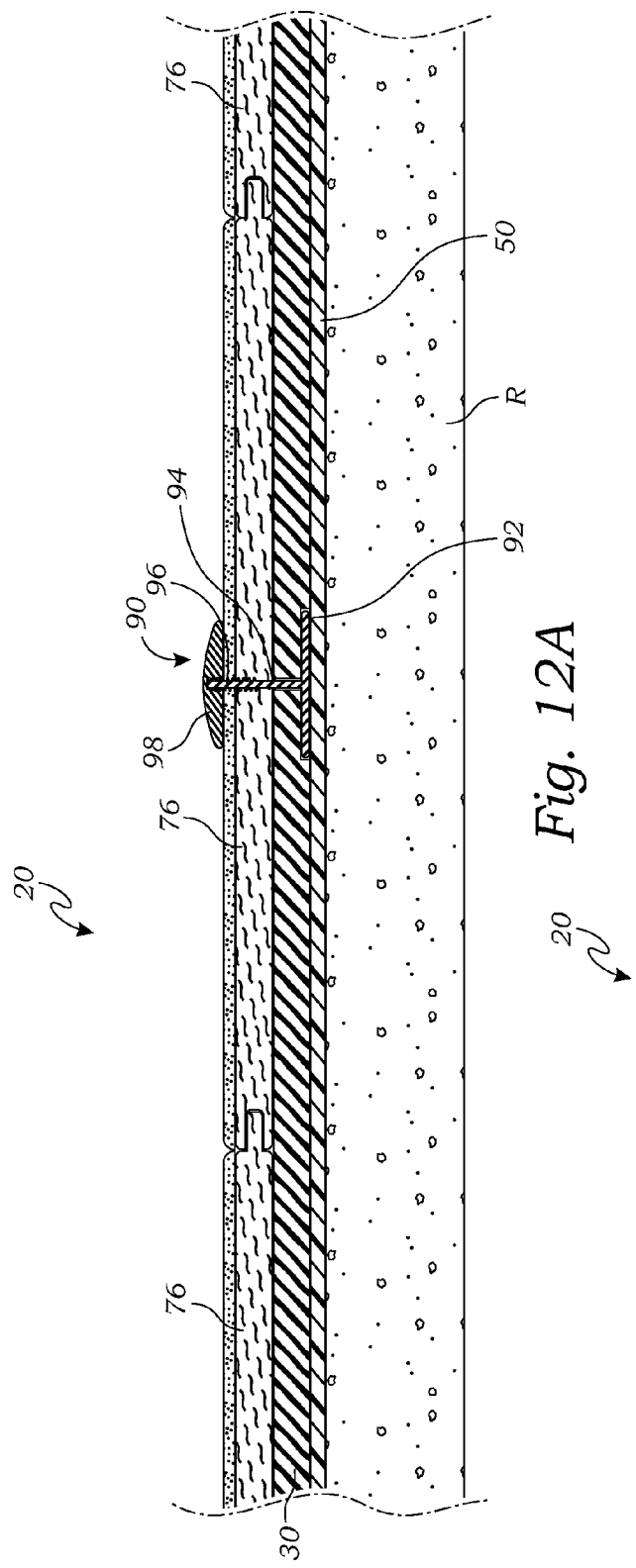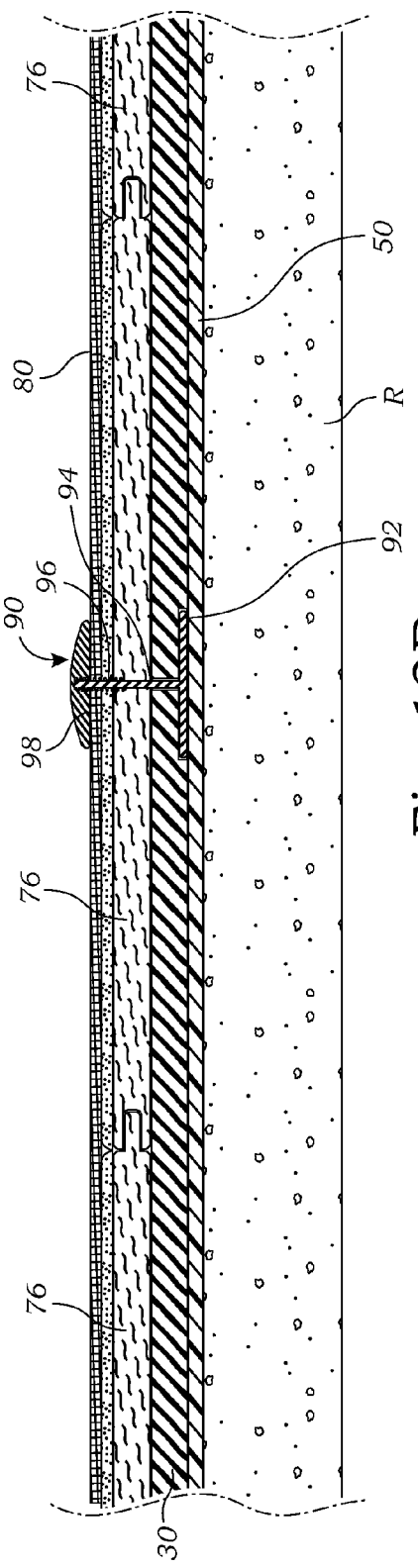

PROTECTED MEMBRANE ROOF SYSTEM

RELATED APPLICATIONS

This is a continuation-in-part application and so claims priority under 35 U.S.C. § 120 and is entitled to the filing date of co-pending U.S. Non-Provisional application Ser. No. 14/775,275 filed Sep. 11, 2015, and entitled "Protected Membrane Roof System," which itself claims priority under 35 U.S.C. § 120 and is entitled to the filing date of U.S. Non-Provisional application Ser. No. 13/798,810 filed Mar. 13, 2013, and entitled "Protected Membrane Roof System," now U.S. Pat. No. 8,863,442. The contents of the aforementioned applications are incorporated herein by reference.

INCORPORATION BY REFERENCE

Applicant(s) hereby incorporate herein by reference any and all patents and published patent applications cited or referred to in this application.

TECHNICAL FIELD

Aspects of this invention relate generally to roof systems and structures, and more particularly to improved protected membrane roof systems.

BACKGROUND ART

In general and for context, a protected membrane roof ("PMR") is generally a typically flat or minimally sloped roof having one or more layers of insulation (specifically extruded polystyrene) installed over the waterproofing membrane and deck assembly. This configuration provides for protection against UV radiation, thermal shock, the elements, and physical abuse for that vital waterproofing membrane below. It is noted that conventional low-sloped roofs place the membrane on top of the insulation, while in "PMR" roof assemblies, that waterproofing membrane is typically placed directly on the structural deck (except for metal decks where a substrate board is installed first). In order to provide "ballasting" for the insulation and "PMR" roof system in general, some type of ballast material such as stones, pavers, or soil (garden roofs) or the like is applied over the insulation layer(s) for further protection of the membrane as well as protection effects for wind uplift resistance for the underlying insulation boards. To protect against scour of the ballast material, it is often preferable to apply a netting over the ballast material (i.e., soil) and now to further expand that to other types of ballast such as pavers and stones. This netting which is applied over the ballast material, either at least around a swatch of the roof perimeter or over the entire roof, is then itself susceptible to wind uplift or being blown off the roof even if staked within the ballast material. To attempt to secure the netting against wind uplift, stakes or anchors are typically applied to or secured within the ballast material itself. On information and belief, the prior art anchoring approach, though perhaps relatively easily installed and relatively inexpensive, results in significantly reduced wind uplift resistance—on the order of only two to four pounds (2-4 lbs).

What is needed is a protected membrane roof system wherein a fastener assembly is secured beneath an insulation board thereof positioned beneath the ballast material for improved wind uplift resistance. Aspects of the present invention fulfill these needs and provide further related advantages as described in the following summary.

DISCLOSURE OF INVENTION

Aspects of the present invention teach certain benefits in construction and use which give rise to the exemplary advantages described below.

The present invention solves the problems described above by providing a protected membrane roof system for installation on a roof decking comprising an upper insulation board having an upwardly-facing upper board top surface and an opposite downwardly-facing upper board bottom surface and at least one through-hole communicating therebetween, a ballast material positioned over the upper insulation board, an optional netting positioned over the ballast material, and at least one fastener assembly having a base seated substantially adjacent the upper board bottom surface, a rod extending substantially vertically from the base of sufficient size so as to extend through the through-hole of the upper insulation board, the ballast material, and the netting, if any, and a cap engaged with the rod above the ballast material, whereby the wind uplift resistance of the protected membrane roof system is improved and scour of the ballast material is reduced by effectively anchoring the ballast material with or without netting to the upper insulation board beneath the ballast material.

A primary objective inherent in the above described apparatus and method of use is to provide advantages not taught by the prior art.

Another objective is to provide such a system wherein any netting positioned over the ballast material is effectively anchored beneath the upper insulation board positioned beneath the ballast material.

Yet another objective is to provide such a system wherein any netting positioned over the ballast material is effectively anchored beneath the top two insulation boards or between the top two and the bottom insulation board where three layers of insulation are employed.

Yet another objective is to provide such a system wherein the base of the fastener system for anchoring the ballast material and any netting is substantially seated within a recess formed in the upper board bottom surface.

Yet another objective is to provide such a system that enables various positioning of a waterproof membrane, including but not limited to directly over the roof decking or between the upper insulation board and an adjacent lower insulation board positioned over the roof decking.

Yet another objective is to provide such a system that allows for a variety of ballast materials.

Yet another objective is to provide such a system that allows for a combination of ballast materials utilized together such as soil, stone, pavers, and/or insulation panels.

Yet another objective is to provide such a system that allows for sufficient ballasting of roof materials with or without the netting.

Yet another objective is to provide such a system that allows for the selective positioning of the fastener assembly within the upper insulation board so as to extend between or through adjacent pavers or insulation panels defining the ballast material.

Yet another objective is to provide such a system that allows for selection of the length of the rod of the fastener assembly to account for variations in the protected membrane roof system, particularly the one or more insulation boards and/or the ballast material.

Yet another objective is to provide such a system that allows for installation in conjunction with additional components, particularly perimeter restraint components or systems.

Yet another objective is to provide such a system that allows for installation in stages while providing sufficient ballasting of roof materials at each stage.

And yet another objective is to provide such a system wherein a pre-fabricated insulation board including an insulation layer having an insulation layer top surface, a facer installed on the insulation layer top surface so as to be coterminous therewith, and at least one through-hole formed in the pre-fabricated insulation board so as to pass through both the insulation layer and the facer may be employed, such as in substitution for the upper insulation board.

Other features and advantages of aspects of the present invention will become apparent from the following more detailed description, taken in conjunction with the accompanying drawings, which illustrate, by way of example, the principles of aspects of the invention.

BRIEF DESCRIPTION OF DRAWINGS

The accompanying drawings illustrate aspects of the present invention. In such drawings:

FIG. 8 is a perspective view of an exemplary insulation board employed in a protected membrane roof system according to aspects of the present invention;

FIG. 9 is an enlarged partial cross-sectional schematic of the exemplary insulation board taken along line 9-9 of FIG. 8;

FIG. 12A is a cross-sectional schematic analogous to FIG. 2 of an eleventh exemplary embodiment;

FIG. 12B is a cross-sectional schematic analogous to FIG. 2 of a twelfth exemplary embodiment;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

MODES FOR CARRYING OUT THE INVENTION

The above described drawing figures illustrate aspects of the invention in at least one of its exemplary embodiments, which are further defined in detail in the following description.

Figure 1:
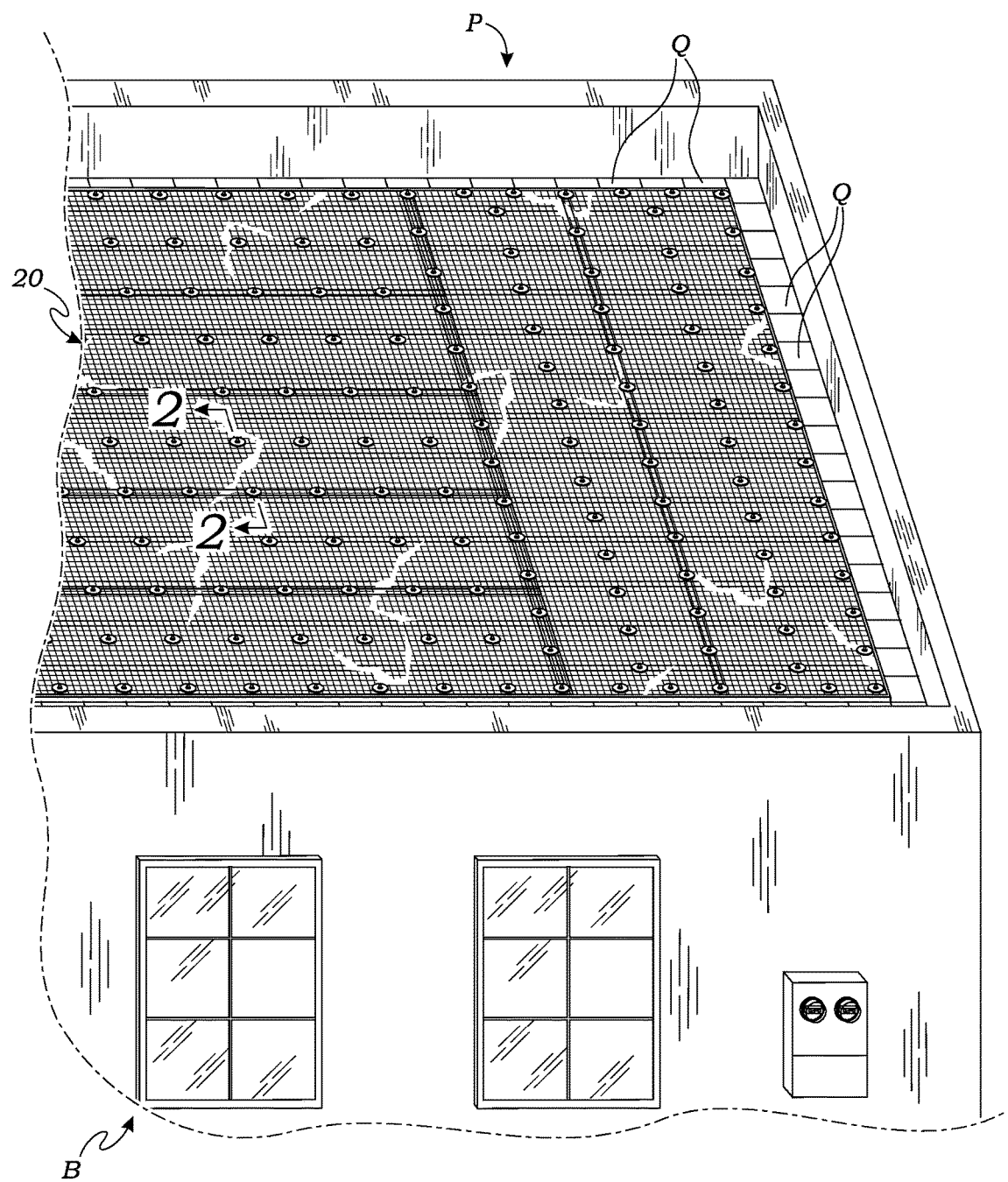
FIG. 1 is a perspective view of a first exemplary embodiment of a protected membrane roof system according to aspects of the present invention.

Turning now to FIG. 1, there is shown a "bird's eye" perspective view of an exemplary embodiment of a protected membrane roof system 20 according to aspects of the present invention. As known in the art, a protected membrane roof ("PMR") is generally a typically flat roof having one or more layers of insulation installed over the waterproofing membrane for protection against UV radiation, thermal shock, the elements, and physical abuse, whereas conventional roofs have the waterproofing membrane installed over the insulation leaving the membrane exposed to the elements. In Protected Membrane Roofs, ballast material such as soil, stones, pavers, or the like is applied over the insulation layer(s) for further insulation and protection effects as well as wind uplift resistance for the underlying insulation boards. To protect against scour of the ballast material, it is often preferable to apply a netting over the ballast material, at least around a swatch of the roof perimeter or over the entire roof, which netting is then itself susceptible to wind uplift or being blown off the roof even if staked within the ballast material. For further context, and again with reference to the illustrative protected membrane roof system 20, it is shown as being installed on a conventional flat-roofed office or industrial building B. Such buildings are commonly formed with a parapet wall P about the perimeter of the roof of the building B, essentially being an extension of the sides of the building B vertically beyond the roof decking R (FIGS. 2-7). Particularly in "garden roofs," or roofs employing vegetation and thus soil as the ballast material, the roofs typically also include vegetation free zones at the perimeters (typically 2' to 4' wide) where stone ballast or 2'×2'×2" pavers Q are utilized. By way of illustration and not limitation, such pavers Q may be manufactured by Hanover Architectural Products under the name Ventloc®. While such an illustrative type of PMR system is thus described generally herein for context, it will be appreciated that the invention is not so limited and may be employed in virtually any PMR system now known or later developed having ballast materials the scour of which is to be prevented.

Figure 2:
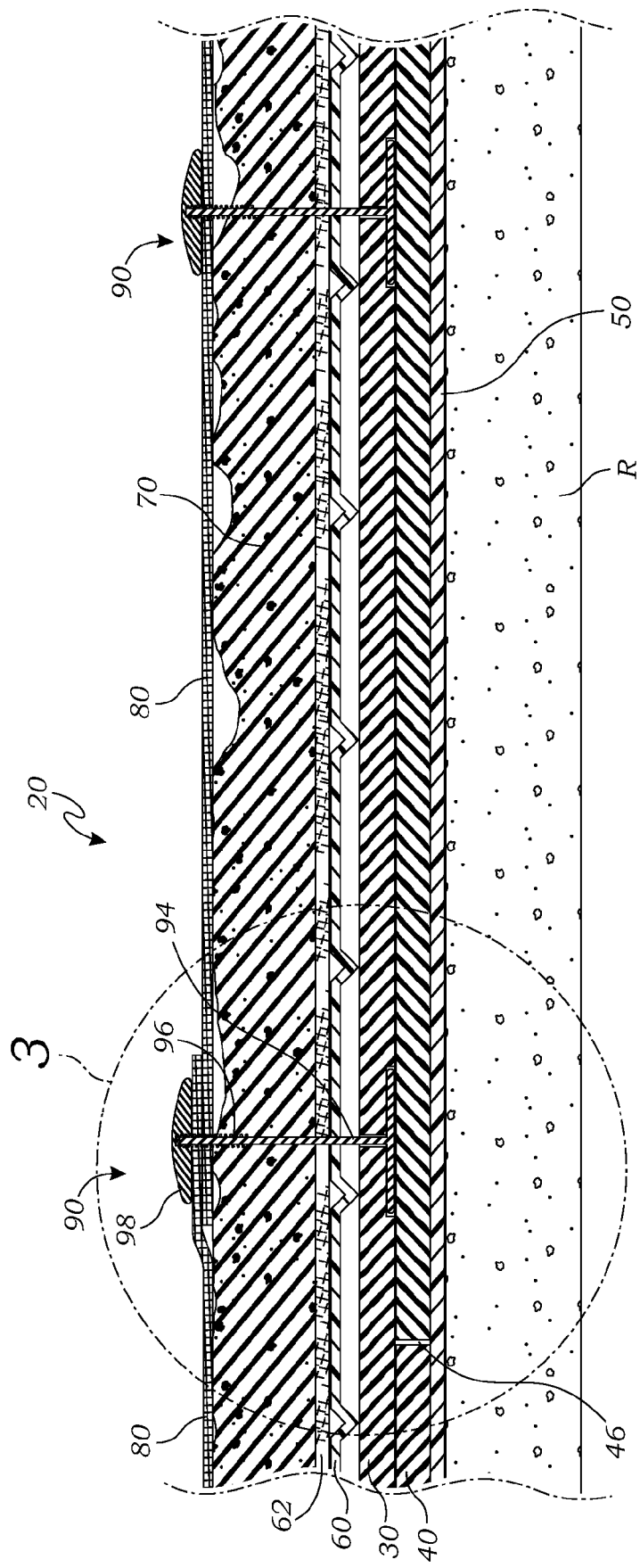
FIG. 2 is an enlarged partial cross-sectional schematic of the first exemplary embodiment thereof taken along line 2-2 of FIG. 1.
Figure 4:
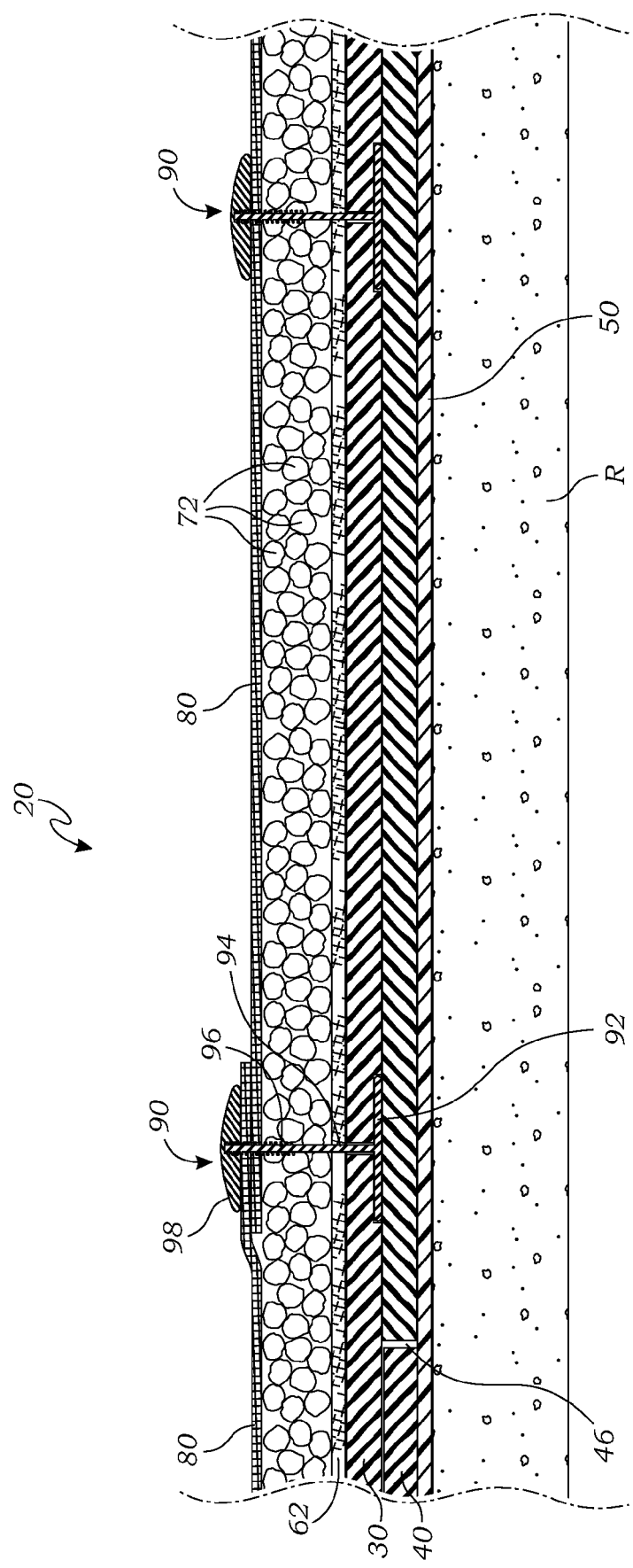
FIG. 4 is a cross-sectional schematic analogous to FIG. 2 of a second exemplary embodiment.
Figure 5:
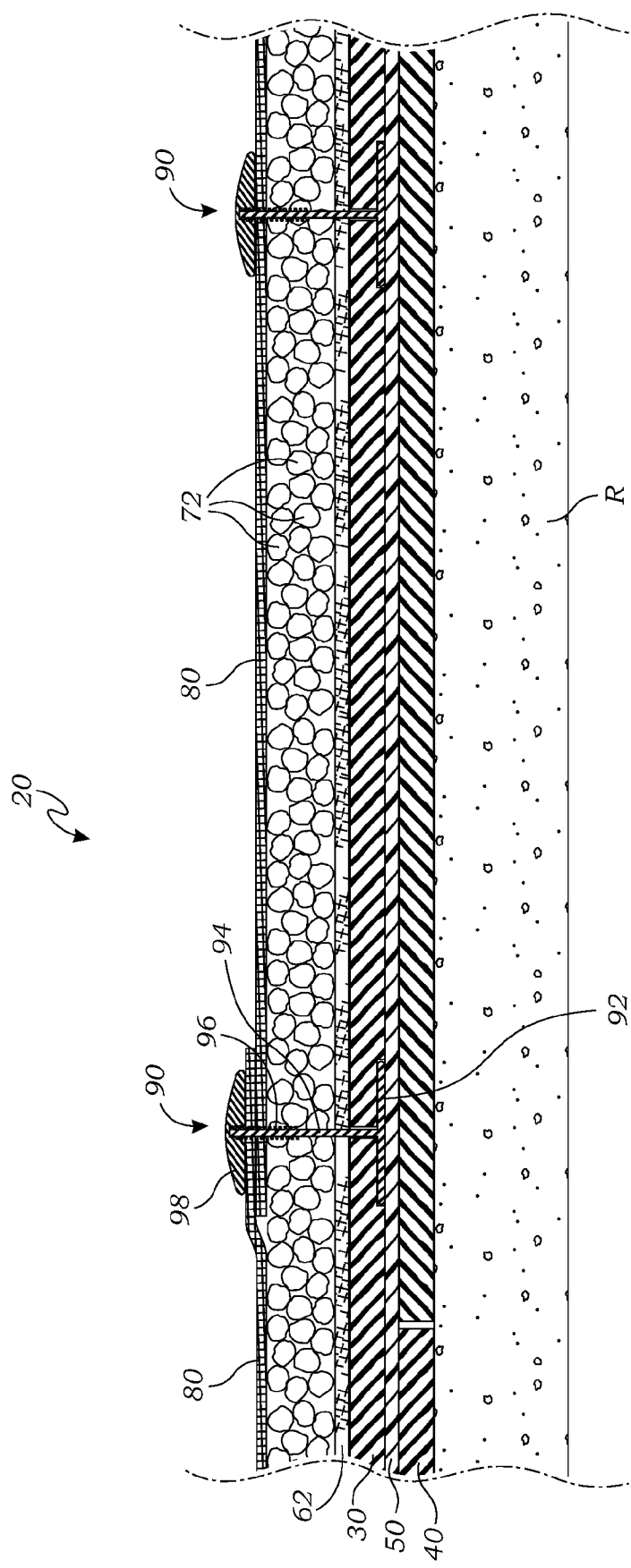
FIG. 5 is a cross-sectional schematic analogous to FIG. 2 of a third exemplary embodiment.

With reference now to the enlarged cross-sectional schematic of FIG. 2, a first exemplary embodiment of the protected membrane roof system 20 is shown as generally comprising over the roof decking R, from bottom to top, a waterproofing membrane 50, a lower insulation board 40, an upper insulation board 30, a drainage retention layer 60, a filter fabric layer 62, soil ballast material 70, and netting 80. At least one fastener assembly 90 is provided for securing the netting 80 over the soil ballast material 70 as described in greater detail further below. In the exemplary embodiment the joints 46 between adjacent boards 40 in the same layer of insulation are to be staggered relative to the joints in an adjacent insulation layer, such that the joints 46 in various layers are not substantially aligned. In the typical embodiment, the upper and lower insulation boards 30, 40 are formed of extruded polystyrene, typically two to six inches (2-6") thick and serving to insulate and provide dew point control, though it will be appreciated that virtually any insulation board now known or later developed as suitable for PMR systems generally, of virtually any material and thickness, may be employed in the present invention. It will be appreciated by those skilled in the art, with further reference to the alternative embodiments shown and described herein below, that while particular layered configurations of the exemplary protected membrane roof system 20 are shown and described, the invention is not so limited, but instead may involve more, fewer, or different layers in varying orders within the construction without departing from the spirit and scope of the invention, such that the exemplary embodiment of FIG. 2 and those further alternative embodiments of FIGS. 4-7 and 10-17 are to be understood as merely illustrative of aspects of the present invention. Specifically, and by way of further example, while soil ballast material 70 is shown in FIG. 2, as well as FIGS. 10, 13A, 13B, and 17B, the invention is not so limited, as stone ballast material 72 may be employed as shown in FIGS. 4 and 5, paver ballast material 74 as shown in FIGS. 6 and 11A-11D, and insulation ballast material 76 as shown in FIGS. 7, 12A, and 12B, and thus the invention is not limited to any such particular ballast material but instead may involve any appropriate ballast material now known or later developed.

Figure 3:
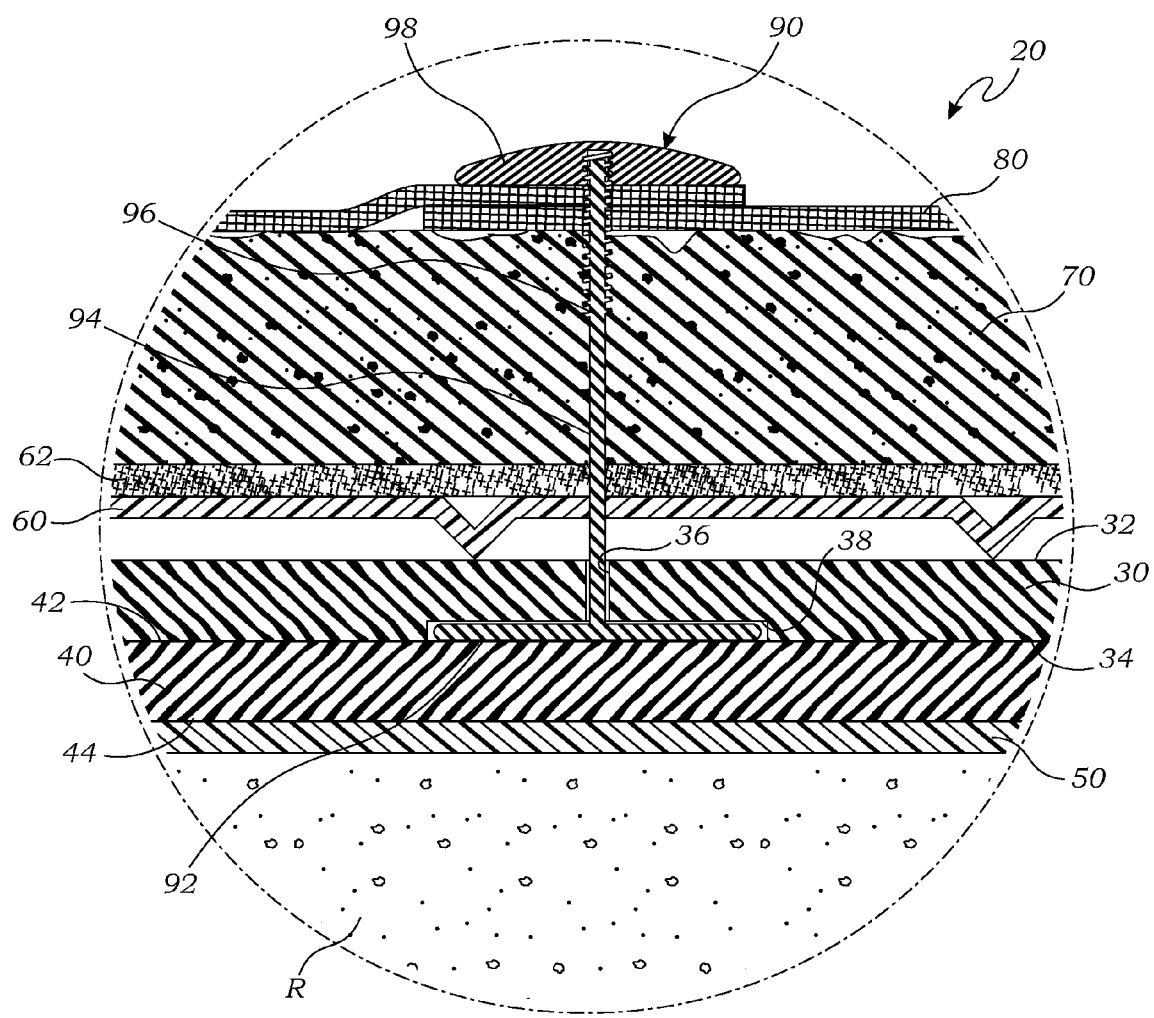
FIG. 3 is a further enlarged partial cross-sectional schematic taken from circle 3 of FIG. 2.

With continued reference to FIG. 2 and further reference to the enlarged partial cross-sectional schematic of FIG. 3, in the first exemplary embodiment of the protected membrane roof system 20, once more, at least one fastener assembly 90 is provided for securing the netting 80 over the soil ballast material 70. More particularly, in the exemplary embodiment, a base 92 of the fastener assembly 90 is positioned beneath the upper insulation board 30, basically substantially trapped between the upper board bottom surface 34 and the lower board top surface 42. As shown, the base 92 is substantially embedded in the upper board bottom surface 34 within a recess 38, though it will be appreciated that it could potentially be embedded in the lower board top surface 42, or some combination of the two, depending on the type of insulation material employed in each board 30, 40 and the treatment of any of the surfaces thereof, and thus how conforming the surfaces of each board 30, 40 might be, as well as the hardness, shape and thickness of the base 92 itself. As such, the recess 38 may be pre-formed in the upper board bottom surface 34 or may be formed therein during the assembly of the protected membrane roof system 20 essentially by the compressive forces acting on the system 20, again depending on the properties of the insulation boards 30, 40 and other factors. Or based on the relative flexibility of the insulation boards 30, 40 and/or the base 92 being sufficiently thin, no such recess 38 may be formed at all in some embodiments while still allowing the fastener assembly 90 to be anchored beneath the upper insulation board 30 and the insulation boards 30, 40 to still be substantially flush upon installation. As such, those skilled in the art will appreciate that the recess 38 may be formed, if at all, on a number of surfaces or in a number of locations and through a variety of means without departing from the spirit and scope of the invention. The base 92 is configured having a rod 94 extending substantially vertically therefrom, which rod 94 may be integral with the base 92 or removably engaged therewith, more about which is said below in connection with alternate embodiments of the system 20. Wherever the fastener assembly 90 is to be placed, and again whether or not a recess 38 is there pre-formed, as the base 92 is seated substantially against or adjacent the upper board bottom surface 34, the rod 94 that extends from the base 92 is to pass through the upper insulation board 30 and out its top surface 32. It will be appreciated that such a through-hole 36 through which the rod 94 passes may further be pre-formed, particularly when the recess 38 is already to be pre-formed, more about which is said below in connection with FIGS. 8 and 9, or may be formed by drilling or other such forming technique "in the field" as the protected membrane roof system 20 is installed. As shown in FIGS. 2 and 3, with the base 92 and vertical fastener rod 94 so positioned beneath and passing through the upper insulation board 30, the rod 94 is configured to have sufficient length to then extend through the ballast material 70 and vertically above the netting 80. As such, by forming a threaded portion 96 on the free end of the rod 94, or opposite the base 92, a mating threaded cap 98 may be threadably installed on the rod 94 so as to secure the netting 80 over the ballast material 70. Accordingly, where additional layers above the upper insulation board 30 such as the illustrated drainage retention layer 60 and filter fabric layer 62 are also employed in the system 20, the rod 94 must thus pass through such layers as well, with any necessary holes therein being formed in the normal course during installation. In the exemplary embodiment, the base 92 of the fastener assembly 90 is substantially annular with a nominal diameter of approximately six inches (6"), the rod is roughly one-quarter inch (¼") diameter, and the threaded cap 98 is also substantially annular with a nominal diameter of approximately four inches (4"). Such components may be made of any suitable metal (e.g., steel or aluminum), plastic (e.g., polyurethane or polyethylene), or other such material now known or later developed. It will be appreciated by those skilled in the art that any such fastener assemblies and components of any such geometrical configuration and material now known or later developed as suitable for a particular PMR context may be employed without departing from the spirit and scope of the invention.

With further reference to FIGS. 1 and 2, in terms of the spacing of the fastener assemblies 90 within the overall protected membrane roof system 20, it is noted that any roof system fastener spacing or density can be employed with any ballast type depending on the building's wind exposure parameters and other factors. In an exemplary embodiment, it is contemplated that one fastener 90 per two foot by eight foot (2'×8') insulation board 30 would be sufficient, though closer spacing of the fasteners 90 (more fasteners per board) is possible to suit a particular application, as shown in FIGS. 1 and 2, or typically not every board 30 would even have a fastener 90 as in other exemplary arrangements disclosed herein. Specifically, where two fasteners 90 are to be employed per board 30, in the interest of having substantially even spacing of the fasteners 90 throughout the system 20 and none of the fasteners too close to an edge of a board, the fasteners 90 would be about four feet (4') apart, or two feet (2') from each short edge, so as to maintain the overall roughly four-foot spacing over the entire system 20, even between fasteners 90 on adjacent boards. It will be appreciated that in some contexts even more fastener assemblies 90 per board 30 may be employed and in some less, with not every board 30 even having a fastener 30. Preferably all such fasteners 90 are located at least one foot (1') from any board edge, but this is not necessarily critical in all applications and certainly is not critical to the spirit and scope of the present invention. Moreover, with the netting 80 typically provided in nominal four-foot (4') or eight-foot (8') widths, such fastener spacing enables alternate fasteners 90 to be positioned along overlapping seams between adjacent sections of netting 90, thereby helping to further secure the netting 80 in position. Such netting 80 as contemplated herein may be any suitable plastic, metal, or other such netting material now known or later developed and used in the art, including in some "garden roof" applications erosion control blankets (combination of woven plastic netting and coconut weave mesh or just mesh). In most cases, the netting 80 is utilized substantially from the roof edge to a point about eight feet (8') inbound, while in other cases such as the exemplary protected membrane roof system 20 shown in FIG. 1, the netting 80 is utilized over the entire roof. Those skilled in the art will appreciate that all such variations in the configuration of the netting 80 and the number and positioning of the fastener assemblies 90 are primarily dictated by the configuration of the building, including its parapet, if any, the type of roof and ballast material to be employed, applicable laws and regulations concerning wind uplift resistance requirements, the specifications of the owner or installer, and other factors, such that once more the exemplary protected membrane roof system 20 is to be understood as merely illustrative of features and aspects of the present invention and so is expressly non-limiting. On information and belief, a system 20 employed according to aspects of the present invention such as shown in FIGS. 1 and 2 may achieve wind uplift resistance of two hundred pounds (200 lbs) or more when employed with comparable ballast material 70, which in the case of soil can vary from typically four to eight inches (4-8") in depth depending on the plants utilized and other factors, or thus from about fifteen to twenty-two pounds per square foot (15-22 lbs/ft$^2$) installed. Those skilled in the art will thus appreciate that by installing the fastener assemblies 90 beneath the upper insulation board 30 as shown in FIG. 2, and so taking advantage of the excellent flexural strength of the foam or other such material from which the insulation board 30 is formed, which boards typically have a thickness of at least two inches (2"), the force to pull out the fastener assemblies 90 or otherwise tear or blow away the netting 80, and thus the effective wind uplift resistance of the resulting overall protected membrane roof system 20 of the present invention is thereby greatly enhanced.

Turning next to FIG. 4, there is shown a cross-sectional schematic analogous to FIG. 2 of a second exemplary embodiment of the protected membrane roof system 20 of the present invention here employing a stone ballast material 72. As in the first exemplary embodiment of FIG. 2, the protected membrane roof system 20 is shown as again generally comprising over the roof decking R, from bottom to top, a waterproofing membrane 50, a lower insulation board 40, an upper insulation board 30, a filter fabric layer 62, here stone ballast material 72, and netting 80, with the drainage retention layer 60 (FIG. 2) here not being employed. An at least one fastener assembly 90 is again provided having a base plate 92 seated beneath the upper insulation board 30 with its rod 94 extending upwardly therethrough and through the filter fabric layer 62 and the stone ballast material 72 and netting 80 for securing the netting 80 thereover. It will be appreciated that in typical stone ballasted PMR systems the layer of stone is not as thick as that of soil, rendering the overall thickness of the system 20 in a stone ballast context not as great as with soil. However, even with the fastener assembly 90 seated once more in the same location within the system 20, namely, with the base 92 between the upper and lower insulation boards 30, 40, it is yet desirable that the retention cap 98 is still positioned substantially adjacent the netting 80 for proper securement. In one embodiment, then, the rod 94 may be selectively shortened to an overall length such that the cap 98 is properly positioned as by simply cutting or trimming the rod 94 at a desired location, noting that the threaded portion 96 is sufficiently long to accommodate such a shortening of the rod 94 and still have threads remaining for engagement of the cap 98 in that particular exemplary method. Or, in an alternative embodiment, the fastener assemblies 90 may simply be produced with rods 94 of varying lengths and the appropriate such fastener assemblies 90 selected for a particular PMR installation ahead of time knowing the ballast material that is to be employed. Relatedly, where the base 92 and rod 94 are integral, such effective sub-assemblies would be substituted depending on the desired length of the rod 94; whereas, in a still further embodiment in which the base 92 and rod 94 are not integral, as by also being threadably engaged, for example, it will be appreciated that rods 94 of varying lengths can thus be substituted one for the other as needed to suit a particular application. In a still further example, the same fastener assemblies 90 may be employed for all jobs, including a single rod length and, rather than being cut or trimmed, the engagement hole in the cap 98 may go completely therethrough so that the rods 94 can do the same and the cap 98 thus be positioned at a wider variety of heights along the rod 94. Relatedly, it will be appreciated by those skilled in the art that while particular rod 94 and cap 98 configurations are shown and described herein as involving a threaded engagement, the invention is not so limited, but instead may involve a number of other engagement or fastening means now known or later developed without departing from the spirit and scope of the invention. In the alternative illustrative embodiment wherein stone ballast material 72 is employed, such may be selected, for example, as ASTM #5 gradation, ASTM #4 gradation, or ASTM #2 gradation crushed stone or washed riverbed stone applied at between ten and twenty pounds per square foot (10-20 lbs/ft$^2$), though once more it will be appreciated that a variety of other such ballast materials now know or later developed may be employed in the protected membrane roof system 20 of the present invention without departing from its spirit and scope.

Referring now briefly to FIG. 5, there is shown an alternate third embodiment similar to that of FIG. 4 wherein once again stone ballast material 72 is employed in the protected membrane roof system 20. Essentially, the one difference is that the waterproof membrane 50 is now positioned between the upper and lower insulation boards 30, 40 rather than beneath the lower insulation board 40 immediately adjacent the roof decking R as in the other embodiments herein. This is simply to illustrate as stated previously that the various layers within the overall protected membrane roof system 20 may be changed, added or removed without departing from the spirit and scope of the invention. For example, then, though a waterproof membrane 50 is now positioned between the upper and lower insulation boards 30, 40, a second such membrane 50 could still be positioned beneath the lower insulation board 40 over the roof decking R as well—any such membranes may be the same or different and single ply or multi-ply depending on the application. Moreover, it will be appreciated regarding placement of such a membrane 50 between the insulation boards 30, 40 as shown in FIG. 5, or immediately adjacent particularly the upper board bottom surface 34 (FIG. 3), that by having the base 92 of the fastener assembly 90 embedded within the upper board bottom surface 34 as by a pre-formed bottom recess 38 or otherwise, the base 92 is thus not likely to interfere with, damage, or otherwise adversely affect the waterproof membrane 50.

Figure 6:
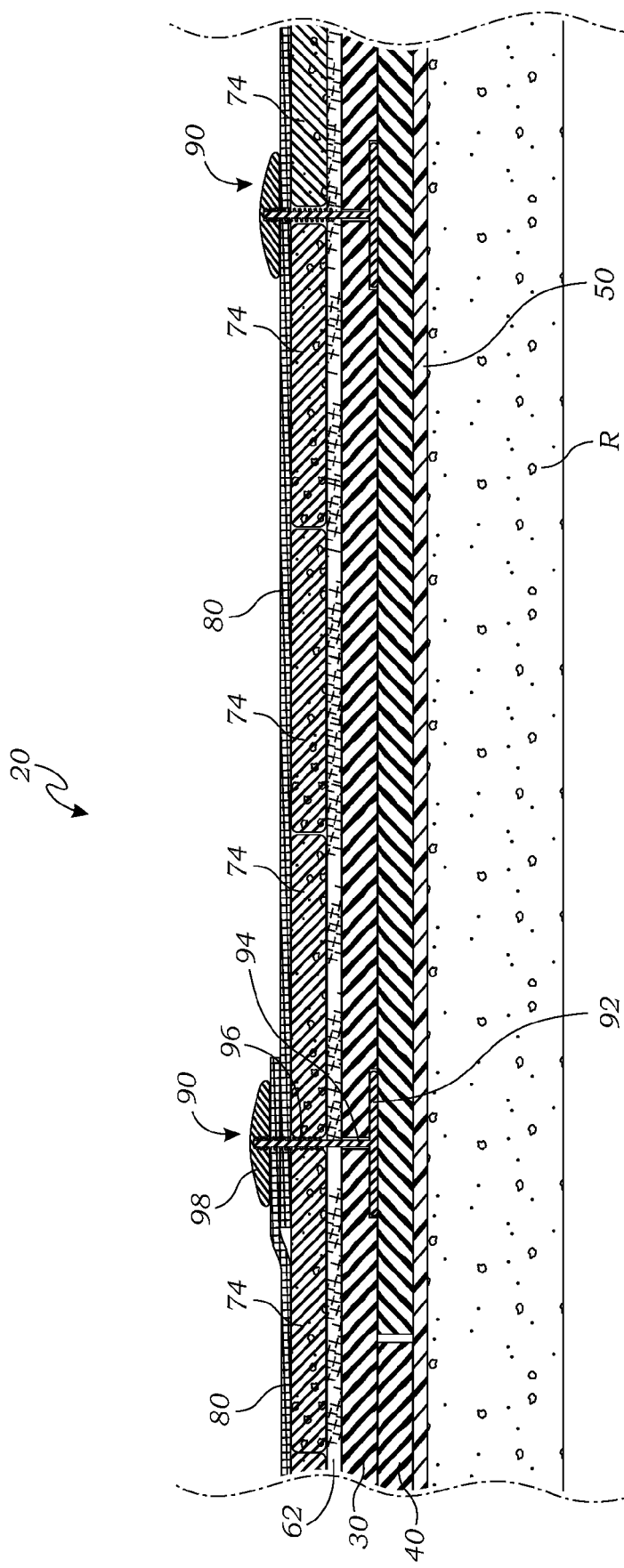
FIG. 6 is a cross-sectional schematic analogous to FIG. 2 of a fourth exemplary embodiment.
Figure 7:
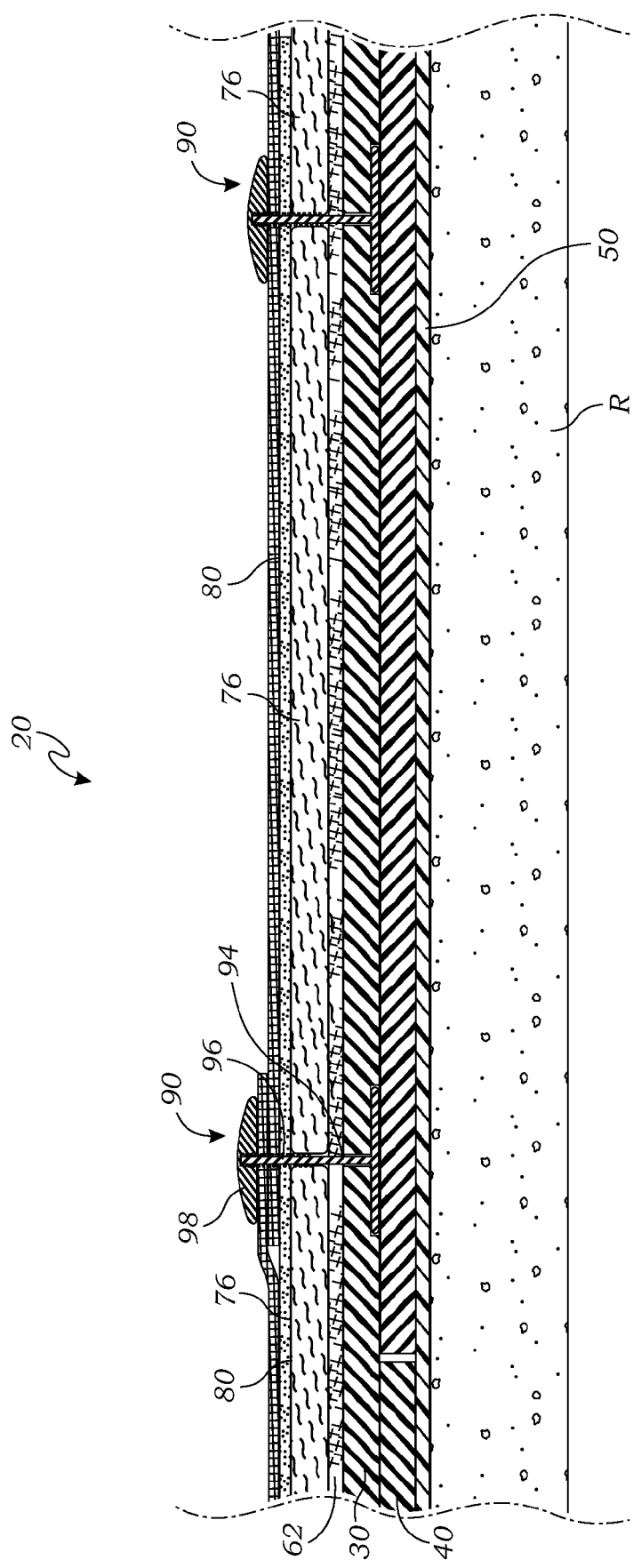
FIG. 7 is a cross-sectional schematic analogous to FIG. 2 of a fifth exemplary embodiment.

Turning next to the cross-sectional schematic view of FIG. 6, there is shown a fourth exemplary embodiment of the protected membrane roof system 20 of the present invention wherein now paver ballast material 74 is employed. Here, the overall system 20 is otherwise analogous to the initial stone ballast exemplary embodiment of FIG. 4 wherein the waterproof membrane 50 is again directly over the roof decking R and there is no drainage retention layer 60 (FIG. 2), though it will be appreciated once more that additionally or instead a single ply or other such membrane may be employed between the insulation boards 30, 40. As shown in FIG. 6, each such paver 74 is to be positioned over the upper insulation board 30 and any fabric filter 62 or other such optional layer employed in the system 20 so as to be substantially square and abutting adjacent pavers 74, except that as also shown the fastener assemblies 90 are to be positioned within the upper insulation board 30 such that the rods 94 extend between adjacent pavers 74 rather than having to pass through a paver 74. In the exemplary embodiment, the pavers 74 are formed of concrete and are roughly two foot by two foot square and two inches thick (2'×2'×2") so that it will be appreciated that with the typical four-foot (4') or eight-foot (8') spacing between fastener assemblies 90 they would thus be positioned each second or fourth paver 74, respectively. It will be further appreciated that any other spacing of the fasteners 90 so long as in two-foot (2') increments would accommodate the exemplary pavers 74 and position the fasteners 90 therebetween, and further that a variety of other paver sizes may be employed with the fasteners 90 simply spaced accordingly. It is also noted, though not shown, that pedestals may be placed beneath the pavers 74 in any of the exemplary embodiments so as to space the pavers 74 from the underlying layers, including the upper insulation boards 30, and so provide a gap for moisture venting; in the exemplary embodiments, such pedestals or spacers may be on the order of three-sixteenth of an inch (3/16"), though it will be appreciated that such is illustrative and non-limiting.

Referring now to FIG. 7, there is shown a cross-sectional schematic view of a fifth exemplary embodiment of the protected membrane roof system 20 wherein now a further insulation ballast material 76 is employed. For purposes of illustration, the overall system 20 is once again shown as in FIGS. 4 and 6 wherein the waterproof membrane 50 is directly over the roof decking R and there is no drainage retention layer 60 (FIG. 2), with the filter fabric 62, though still shown in FIG. 7, being particularly optional in conjunction with such insulation ballast material or panels 76. Here, analogous to the fourth exemplary embodiment of FIG. 6 wherein paver ballast material 74 is used, the insulation ballast material 76 in the exemplary embodiment of FIG. 7 is two foot by four foot (2'×4') concrete-faced Styrofoam® insulation (such as manufactured and sold under the name Lightguard®), the panels 76 having either a nominal two inch (2") or three inch (3") thick Styrofoam® insulation with a nominal three-eighths inch (3/8") thick latex modified concrete face, the details of which are not shown in FIG. 7 and are beyond the scope of the present invention. Again, virtually any comparable panel or board now known or later developed may be employed so as to again be laid substantially square and abutting adjacent panels 76 so as to serve as a ballast within the PMR system 20, with the fastener assemblies 90 once more preferably positioned within the upper insulation board 30 such that the rods 94 extend between adjacent ballasting panels 76 rather than having to pass through a panel 76. Here, with the panels 76 being a nominal two foot by four foot (2'×4'), it will again be appreciated that with the typical four-foot (4') or eight-foot (8') spacing between fastener assemblies 90 they would thus be positioned between each panel or at each second or fourth panel 76, respectively, depending on the number and spacing of the fasteners 90 and the orientation of the panels 76. It will be further appreciated that any other spacing of the fasteners 90 so long as in four-foot (4') increments in one direction would accommodate the exemplary panels 76 and position the fasteners 90 therebetween, it being noted that the exemplary Lightguard® insulation panels 76 are formed with tongue and groove long edges, making it further preferable in that particular embodiment to space the fasteners at least every four feet (4') in the panel lengthwise direction so as to position them only along the short edges thereof and so not interfere with the tongue-and-groove joints on the long edges. Again, a variety of other panel or insulation board sizes may be employed, with the fasteners 90 simply spaced accordingly.

With reference now to FIGS. 8 and 9, there is shown an exemplary pre-fabricated insulation board 100 according to aspects of the present invention having a basic insulation layer 102 formed of an extruded polystyrene foam or the like of a nominal two to six inch (2-6") thickness; again, any appropriate material now known or later developed may be employed in a variety of thicknesses without departing from the spirit and scope of the invention. In the illustrated embodiment, the pre-fabricated insulation board 100 is formed with two holes 110 to accommodate fastener assemblies 90 such as shown in FIGS. 2-7 and 10-17, though again it will be appreciated that any number of fasteners 90 and thus holes 110 may be employed and that whether one or multiple holes 110 are pre-formed in the insulation board 100, not all holes 110 need be used in a particular roof system 20; accordingly, it will be appreciated that in other embodiments some such boards 100 may be formed with holes 110 and some not, and in any case such holes 110 may be pre-formed in some or all boards 100 or may be formed on-site by the installer. With the exemplary board 100 having a nominal length L of eight feet (8') and a nominal width W of four feet (4'), the holes 110 are thus positioned in the board 100 so as to be a distance D of two feet (2') from each long edge and from the respective short edge. As a result, the two holes 110 on a single board 100 are substantially four feet (4') apart as are each hole 110 from the closest hole on an adjacent board forming part of an overall protected membrane roof system 20 according to aspects of the invention as shown in FIG. 1. In an alternative embodiment, the pre-fabricated insulation board 100 has a nominal length L of four to eight feet (4-8') and a nominal width of two to four feet (2-4') so that one hole 110 to accommodate a single fastener 90 may be formed in each board 100, though again those skilled in the art will appreciate that a variety of such prefabricated boards 100 in terms of dimension and structure is possible according to aspects of the present invention without departing from its spirit and scope. Furthermore, at the base of any through-hole 110, or in the insulation layer bottom surface 106, a relatively larger diameter recess 112 may be pre-formed so as to accommodate the base 92 of a later-inserted fastener assembly 90 as shown particularly in FIG. 3. It will be appreciated that by pre-forming such through-hole 110 and optional recess 112 the installation of the boards 100 in the field, and particularly the installation of fastener assemblies 90 therewith, is made easier and errors related to the proper spacing of the fasteners 90 are eliminated. As a further optional feature of the pre-fabricated insulation board 100, a polyethylene facer 108 may be applied to the insulation layer top surface 104 so as to then form the top side of the insulation board 100, though once more any other such material now known or later developed having suitable strength and water-resistance may optionally be employed within a pre-fabricated insulation board 100 according to aspects of the present invention. It will be appreciated by those skilled in the art that such a pre-fabricated insulation board 100 may be substituted for the upper insulation board 30 in any of the exemplary embodiments of the protected membrane roof system 20 as shown in FIGS. 2-7 or in any other such PMR system according to aspects of the present invention without departing from its spirit and scope.

Turning to FIGS. 10-13, there are shown enlarged cross-sectional schematics analogous to FIG. 2, here illustrating still further exemplary embodiments of the protected membrane roof system 20 according to aspects of the present invention, each of which it will be appreciated is further illustrative but non-limiting of the invention. More generally, those skilled in the art will again appreciate that a variety of configurations of the roof system 20 are possible according to aspects of the present invention, in terms of varying one or more of the ballast material, the insulation boards, the fasteners and netting, and other layers within the system 20, as dictated by a number of design and usage criteria, including but not limited to factors such as building height and dimensions, including parapet dimensions, and climate, including typical temperature range and wind conditions. First, a variety of other types and combinations of ballast materials may be employed beyond those shown and described; that is, not only may other ballasts be employed and any of the ballast materials in varying thicknesses, but combinations of such ballast materials may also be employed together, as further illustrated in FIGS. 15 and 16. Second, the number and physical and geometric properties of any insulation boards employed in the roof system 20 may also vary depending on a variety of factors. While one, two, and three layers of insulation boards are illustrated, it will be appreciated that other numbers and thicknesses of such layers are possible according to aspects of the present invention without departing from its spirit and scope, even no layers of insulation board apart from the ballast itself, more about which is said below. Third, a virtually infinite variety of fastener and netting arrangements are possible, both in terms of the very presence of the netting, it being included in some systems 20 and not in others, and in terms of the placement of the fasteners anchoring the ballast material, again, with or without any netting, in terms of the locations of the fasteners relative to the ballast material and/or any insulation boards and relative to each other, as in fastener spacing or density, any and all of which again may vary depending on a number of factors. And fourth, other layers may be incorporated within (added to or removed from) the system 20 to suit particular applications, as might again be dictated by the building configuration, the geographical location, the kind of ballast material, etc. Once more, it will be appreciated by those skilled in the art that a number of such arrangements are possible according to aspects of the present invention without departing from its spirit and scope, such that all exemplary embodiments shown and described herein are to be understood as illustrative and non-limiting.

Figure 10:
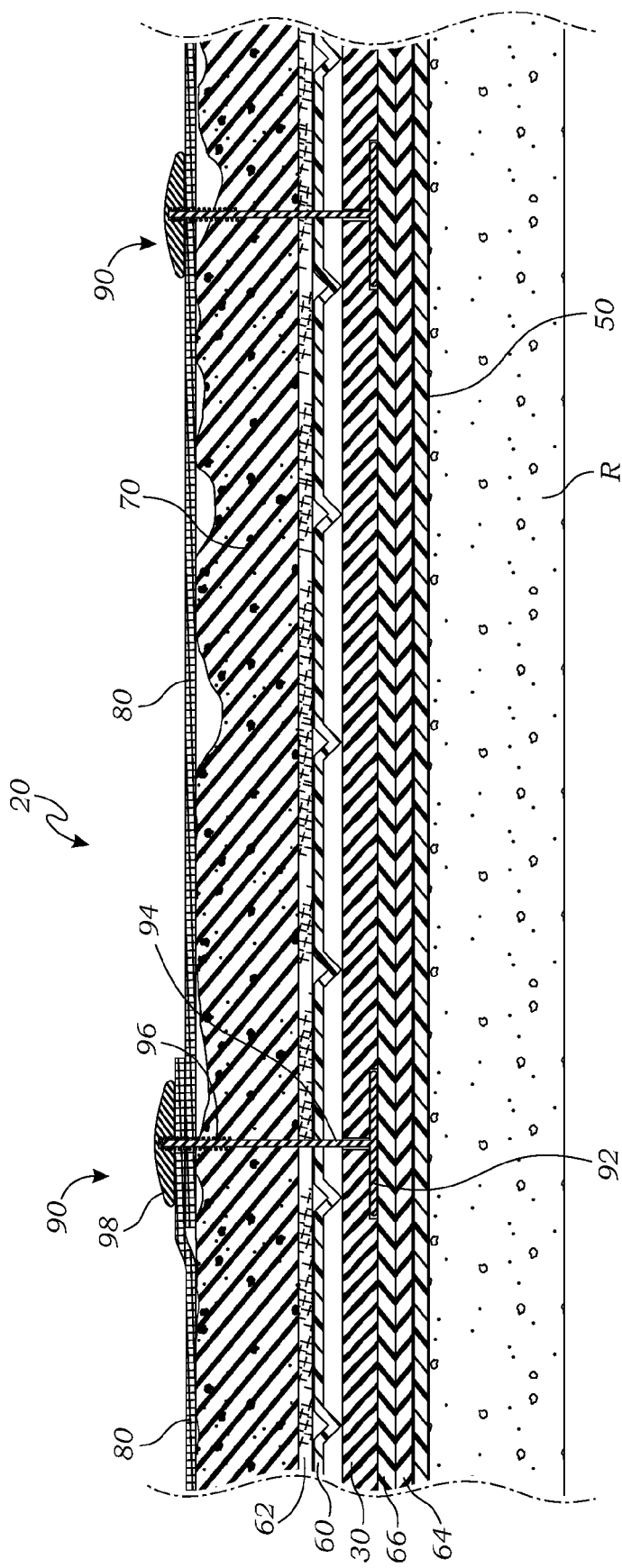
FIG. 10 is a cross-sectional schematic analogous to FIG. 2 of a sixth exemplary embodiment.

With reference now to the enlarged cross-sectional schematic of FIG. 10, a sixth exemplary embodiment of the protected membrane roof system 20 is shown as again generally comprising one or more layers of insulation boards 30 over a waterproofing membrane 50, a soil ballast 70 over the insulation board(s) 30, and a netting 80 over the ballast 70 and anchored beneath the at least one insulation board 30. More specifically, here, over the roof decking R, the exemplary system 20 entails, from bottom to top, a waterproofing membrane 50, a protection course layer 64, which is effectively a second membrane, a root barrier layer 66, a single layer of upper insulation boards 30, a drainage retention layer 60, a filter fabric layer 62, soil ballast material 70, and netting 80. Again, at least one fastener assembly 90 is provided for securing the netting 80 over the soil ballast material 70, the spacing of which is not to be taken literally or to scale from the schematic. It will thus be appreciated that in the alternative roof system 20 of FIG. 10, such a "garden roof" with soil ballast 70 may be employed in relatively warmer climates, thus enabling the use of a single insulation board layer 30. The filter fabric layer 62 and drainage retention layer 60 above the insulation board 30 provide protection from other elements such as moisture and even root growth from any plants placed within the soil ballast 70 of the garden roof system 20 illustrated. As a further protection, though, in the illustrated alternative embodiment, there is again provided beneath the insulation board 30, or between the rest of the system and the membrane 50, the root barrier layer 66 and the protection course layer 64, each of which serving as a further protection for the waterproofing membrane 50 and thus the structure beneath. Again, the protection course layer 64 serves as effectively a second membrane—in the exemplary embodiment, the protection course 64 is a nominal 90 mil (0.090") thick modified bitumen membrane—and the root barrier 66, as the name implies, serves to protect against further penetration of any plant roots that may have grown through the soil ballast 70 and the insulation board 30 and any other layers in between—in the exemplary embodiment, the root barrier 66 is a nominal 10 mil (0.010") thick polyethylene material; however, those skilled in the art will appreciate that the inclusion of such layers 64, 66 is optional, and if any such layers 64, 66 are included they may be in any order or location, of any thickness, and/or of any material now known or later developed. It will also be appreciated that such one or more layers 64, 66 between the single layer of insulation boards 30 and the waterproof membrane 50 serve to physically separate the fastener base 92 from the membrane 50 and thus further protect the membrane 50 even as the fastener 90 is anchored beneath the single insulation board 30. Once more, in the typical embodiment, the insulation boards 30 are formed of extruded polystyrene, typically two to six inches (2-6") thick and serving to insulate and provide dew point control, though it will again be appreciated that virtually any insulation board now known or later developed as suitable for PMR systems generally, of virtually any material and thickness, may be employed in the present invention.

Figure 11A:
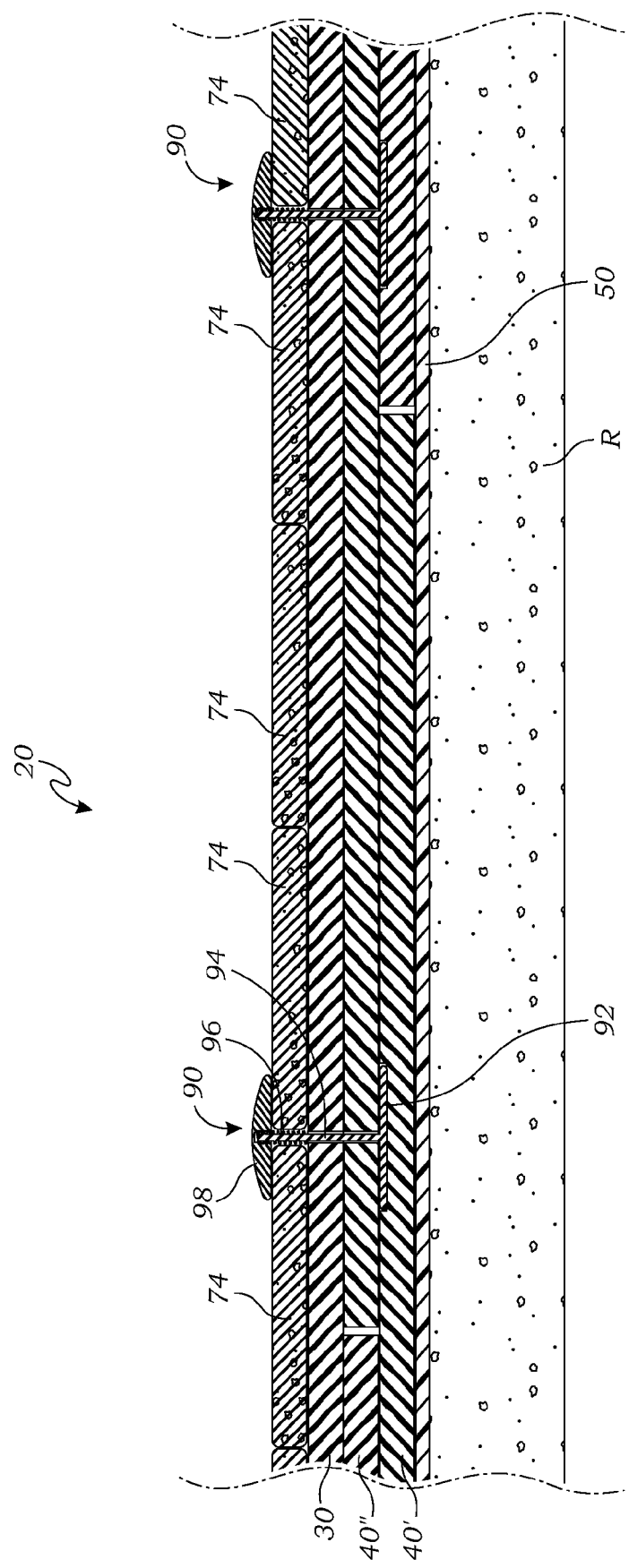
FIG. 11A is a cross-sectional schematic analogous to FIG. 2 of a seventh exemplary embodiment.

Turning next to the cross-sectional views of FIGS. 11A-11D, there are shown four additional exemplary, related embodiments of the protected membrane roof system 20 according to aspects of the present invention, here each having as the ballast material a layer of pavers 74 over three layers of insulation boards—a first layer of upper insulation boards 30 and two abutting layers of lower insulation boards 40', 40". As illustrated, the fastener assembly 90 is anchored beneath and passes through the top two layers of insulation boards—the upper insulation board 30 and the second lower insulation board 40". That is, what is considered the first lower insulation board 40' is placed over the waterproof membrane 50 and then the second lower insulation board 40", or what is in the exemplary system 20 the intermediate insulation board within the three layers, is placed over the first lower insulation board 40', between it and the upper insulation board 30. Accordingly, it is between the first and second lower insulation boards 40', 40" that the fastener base 92 is positioned, with the fastener rod 94 then passing up through the second lower insulation board 40" and the upper insulation board 30. It will be appreciated by those skilled in the art that the fastener assembly 90 could also just be anchored in the upper insulation board 30 or could be anchored in all three insulation boards 30, 40', 40" as by having the fastener base 92 beneath the first lower insulation board 40', between it and the membrane 50, depending on a number of factors related to the installation context. It will also be appreciated that while not shown, a variety of other membrane or other layers may be employed between or adjacent to the various insulation boards 30, 40', 40", and once more, any number of such insulation board layers may also be employed, as may be dictated by their thicknesses along with the commercial application, the three boards shown being understood as illustrative and non-limiting; it will be further appreciated that here a system 20 as in the illustrated embodiment having three layers of insulation boards 30, 40', 40" may be employed in a commercial application in a relatively colder climate, for example. As shown in FIG. 11A, the fastener rod 94, upon passing through the upper insulation board 30, is here positioned as passing between adjacent pavers 94 that otherwise abut to form the ballast material layer of the roof system 90, with the fastener cap 98 then threadably or otherwise installed on the rod 94 so as to span the edges of adjacent pavers 74. Whether or not the pavers 74 are in any way interlocking, it will be appreciated that by periodically anchoring one or more pavers 74 of the ballast layer within at least one layer of insulation boards 30, 40', 40" the overall wind uplift resistance of the system 20 is improved, in that by intermittently fixing the positions of pavers 74 within the layer, the relative abutting positions of the remaining pavers 74 are in that sense fixed as well. Similarly, in FIG. 11B, each fastener assembly 90, and rod 94 specifically, may instead pass through a hole formed in a respective paver 74, or basically through the body of a single paver 74 rather than through the joint or gap between adjacent pavers 74, it being appreciated that such a gap results, in part, due to the presence of the fastener rod 94. Accordingly, it will be further appreciated that by passing the fastener rods 94 intermittently through various ones of the pavers 74, all pavers 74 in the ballast layer may thus be directly abutting as shown, further fixing the relative locations within the ballast layer of all pavers 74 even while only fastening some of the pavers 74. Those skilled in the art will appreciate that depending on the application, the fastener density or spacing can vary widely, from having a fastener in every or every other paver 74 or joint to a more infrequent distribution. And as will be explained further below particularly in connection with FIG. 16A, the fastener density can vary even throughout a single roof system 20, such as having a relatively higher fastener density around the perimeter of the system 20 and a relatively lower fastener density throughout the middle of the system 20. And with reference to FIGS. 11A and 11B together, it will be appreciated in the exemplary embodiments this anchoring of the paver ballast material 74 is shown here as being accomplished without netting, the fastener caps 98 simply being positioned directly over the pavers 74. Alternatively, with reference to FIGS. 11C and 11D, there are shown further exemplary embodiments analogous to FIGS. 11A and 11B, respectively, here further including a netting 80 over the ballast layer, here of pavers 74, such that the netting 80 is trapped between the pavers 74 and the fastener caps 98. It will be appreciated that by further tying the system together with the netting 80, wind uplift resistance is all the more improved, as the netting 80 would serve to further restrain both upward movement of any paver 74 and lateral movement of any paver 74 relative to another essentially "from above" even as such lateral movement is restrained "from below" by anchoring the fastener assembly 90, and the fastener rod 94 specifically, within the one or more layers of insulation boards 30, 40', 40". Those skilled in the art will appreciate in connection with the exemplary embodiments of FIGS. 11A-11D that while pavers 74 of a uniform size or dimension are illustrated, a variety of other ballast materials of various sizes and shapes, again whether interlocking or free-floating or abutting, may be employed within a protected membrane roof system 20 according to aspects of the present invention without departing from its spirit and scope. By way of illustration and not limitation, such pavers 74 may be those manufactured by Hanover Architectural Products under the name Ventloc®, having nominal dimensions of one foot by one-and-a-half feet and two inches thick (1'×1½'×2") (or, more precisely 11¾"× 17⅝"×2").

Referring next to FIGS. 12A and 12B, there are shown further cross-sectional schematic views of alternative exemplary embodiments of the protected membrane roof system 20, here with interlocking insulation panels 76 as the ballast above a single layer of insulation boards 30 applied directly over the membrane 50, such as where the climate or other aspects of the commercial application allow for relatively less insulation. In a bit more detail, in FIG. 12A there is shown an exemplary system 20 comprising, from bottom to top, a waterproofing membrane 50, an upper insulation board layer 30, and a layer of insulation panels 76, with at least one fastener assembly 90 anchored within the upper insulation board 30 and passing through one of the insulation panels 76 at an intermediate location. It will be appreciated that by virtue of the ballast insulation panels 76 interlocking and then anchoring such panels 76 intermittently to the insulation boards 30 below, the overall system 20 is relatively more secured or has relatively greater wind uplift resistance, as the spaced-apart fasteners 90 serve to both maintain the relative positions of the panels 76, as by preventing or minimizing relative lateral movement therebetween, and to maintain the vertical position or prevent upward movement of the anchored panel 76, and thereby of the whole ballast layer due to the panels 76 interlocking, though it will be appreciated that such advantage is achieved even if the panels are not interlocking, as noted above in connection with the alternative embodiments involving abutting pavers 74 as the ballast material layer as shown in FIGS. 11A-11D. Though it will be further appreciated that by interlocking the pavers 74 or panels 76 or any other such ballast material relatively greater wind uplift resistance may be achieved, all else being equal. Or, put another way, to achieve effectively the same or similar wind uplift resistance fewer fasteners 90 or a reduced fastener density could be employed in an interlocking ballast context relative to a system wherein the ballast pavers or panels or other such ballast do not interlock. Moreover, as discussed above in connection with the particular alternative embodiments of FIGS. 11C and 11D in the paver 74 context, here in the insulation panel 76 context as shown in FIG. 12B, netting 80 may again be provided over the insulation panel ballast layer 76 as trapped between the panels 76 and the fastener caps 98. It will be appreciated that by further tying the system together with the netting 80, wind uplift resistance is all the more improved, as the netting 80 would serve to further restrain both upward movement of any panel 76 and lateral movement of any panel 76 relative to another essentially "from above" even as such lateral movement is restrained "from below" by anchoring the fastener assembly 90, and the fastener rod 94 specifically, within the one or more layers of insulation boards 30. Relatedly, it will again be appreciated that any such arrangement, with or without netting 80, may be employed in further alternative embodiments including additional or different layers of insulation and other protective layers as herein described, such that the exemplary embodiments shown and described in connection with FIGS. 12A and 12B are to be understood as merely illustrative and non-limiting. Furthermore, in an alternative exemplary embodiment similar to that shown in FIG. 12B, the layer of insulation boards 30 may be removed altogether such that the insulation panels 76 are applied directly over the membrane 50 and thus serve as both the insulation and the ballast, with the fasteners 90 being anchored within the panels 76 themselves or only and thereby still securing the netting 80 snugly over the layer of insulation panels 76 to maintain the relative vertical and later positions of the panels 76 and thus the overall system 20 against wind uplift, the netting 80 essentially tying the layer of panels 76 together in their abutting or interlocking arrangement and creating a more integral "whole." By way of further illustration and not limitation, it is again noted that the insulation ballast material 76 in the exemplary embodiments here of FIG. 12A and 12B is two foot by four foot (2'×4') concrete-faced Styrofoam® insulation such as manufactured and sold under the name Lightguard®, the panels 76 having a nominal two inch (2"), two-and-a-half inch (2½"), or three inch (3") thick Styrofoam® insulation with a nominal three-eighths inch to five-eighths inch (⅜-⅝") thick latex modified concrete face. Such Lightguard® panels 76 are most commonly configured to interlock, as with tongue-and-groove-type joints, along their long edges and simply abut along their short edges. From the foregoing it will be appreciated that anchoring such a system of insulation panels 76 at least within one or more insulation boards 30 beneath and/or with a netting 80 above and thereby substantially securing their relative lateral positions thus serves to better secure the overall ballast layer against wind uplift. And once more, any such arrangement of panels of any size or configuration and with any related arrangement of the rest of the system 20 and particularly the fasteners 90, in terms of locations and densities or spacing, and with or without any netting 80, are possible according to aspects of the present invention without departing from its spirit and scope.

Figure 13A:
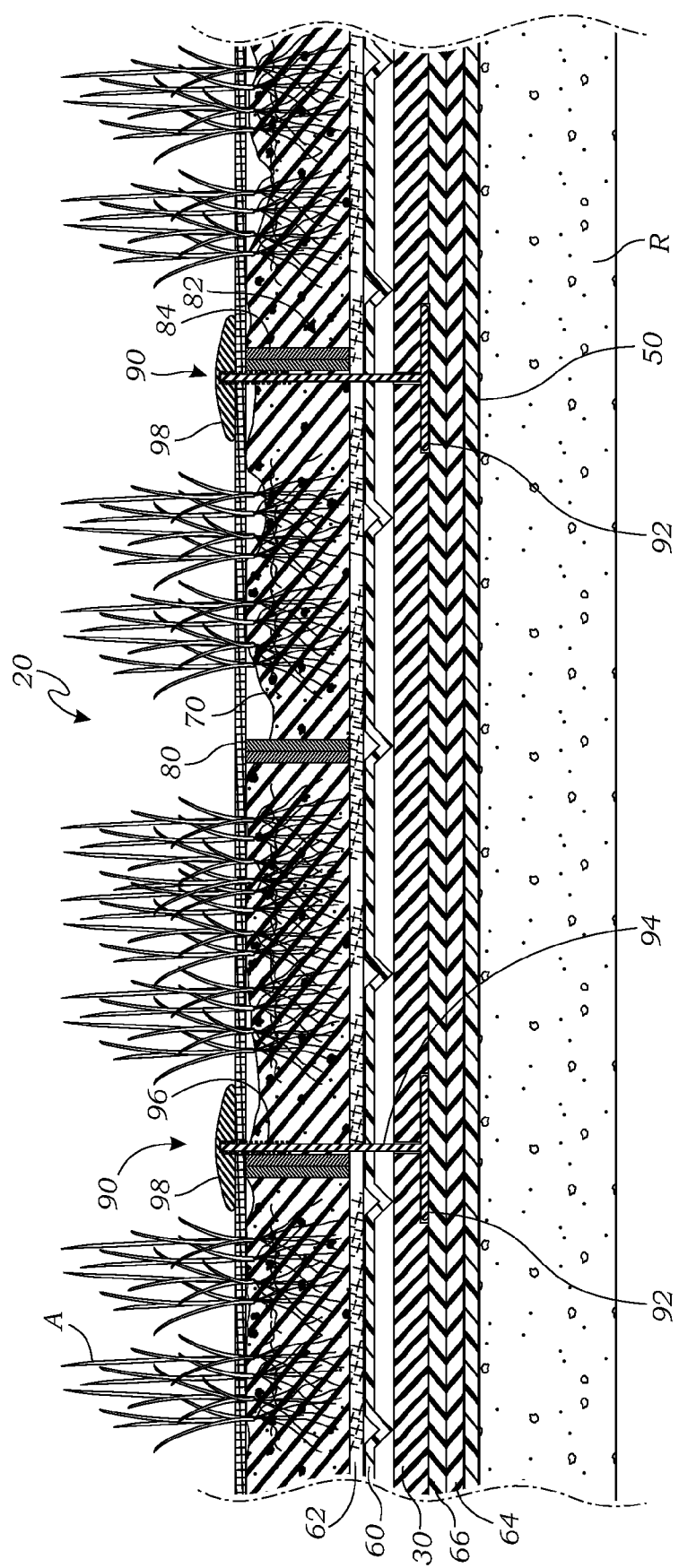
FIG. 13A is a cross-sectional schematic analogous to FIG. 2 of a thirteenth exemplary embodiment.
Figure 13B:
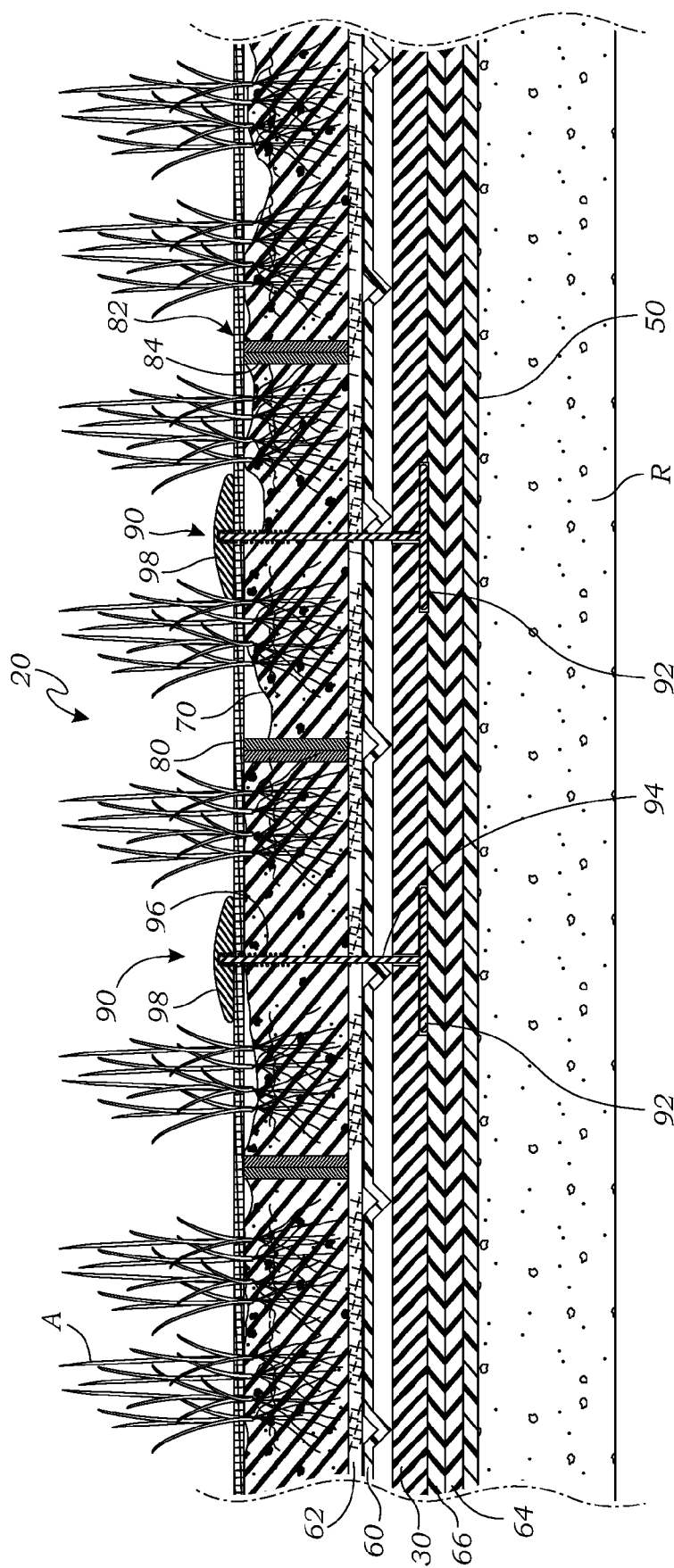
FIG. 13B is a cross-sectional schematic analogous to FIG. 2 of a fourteenth exemplary embodiment.
Figure 14:
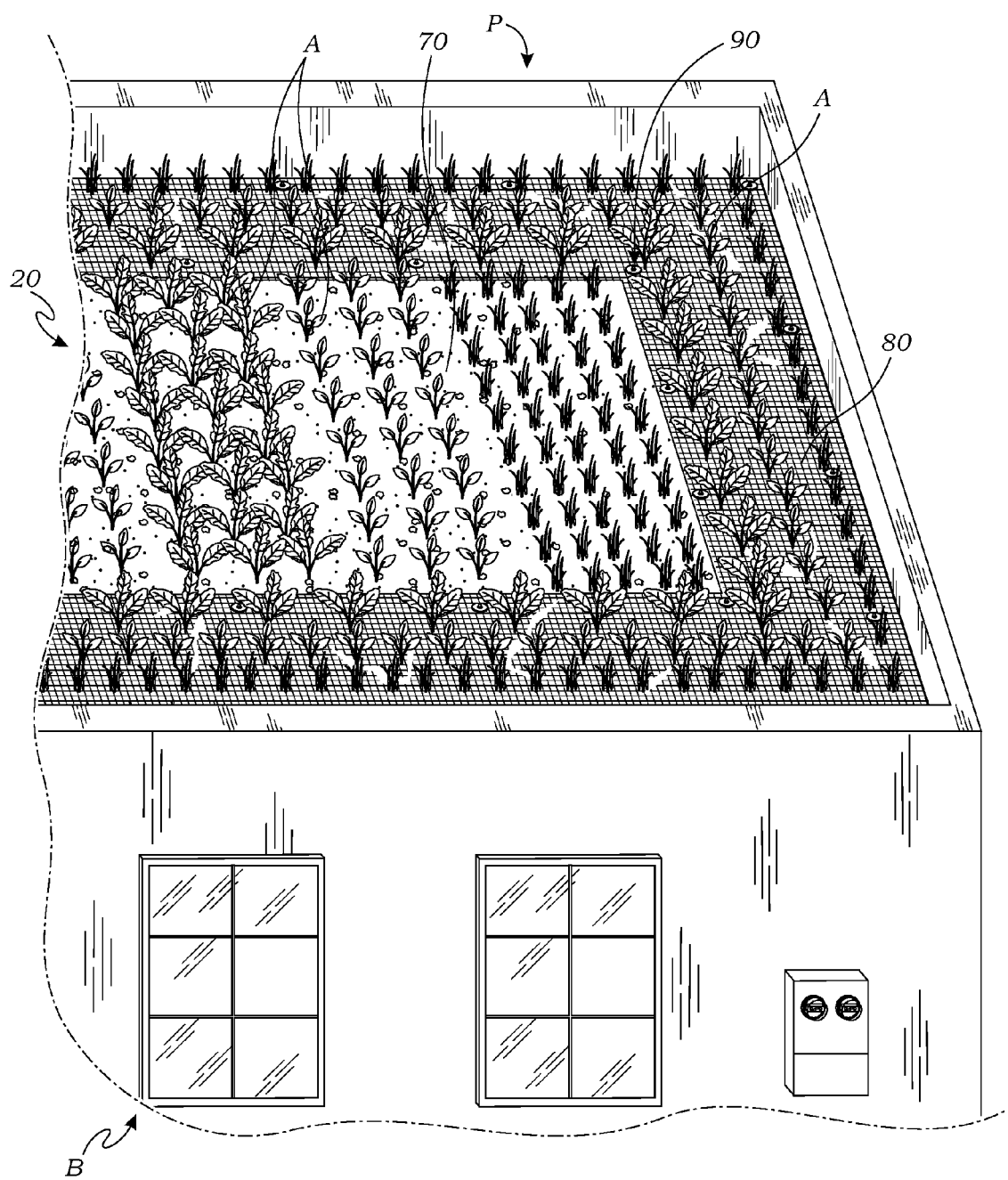
FIG. 14 is a perspective view of a fifteenth exemplary embodiment of a protected membrane roof system according to aspects of the present invention.
Figure 15:
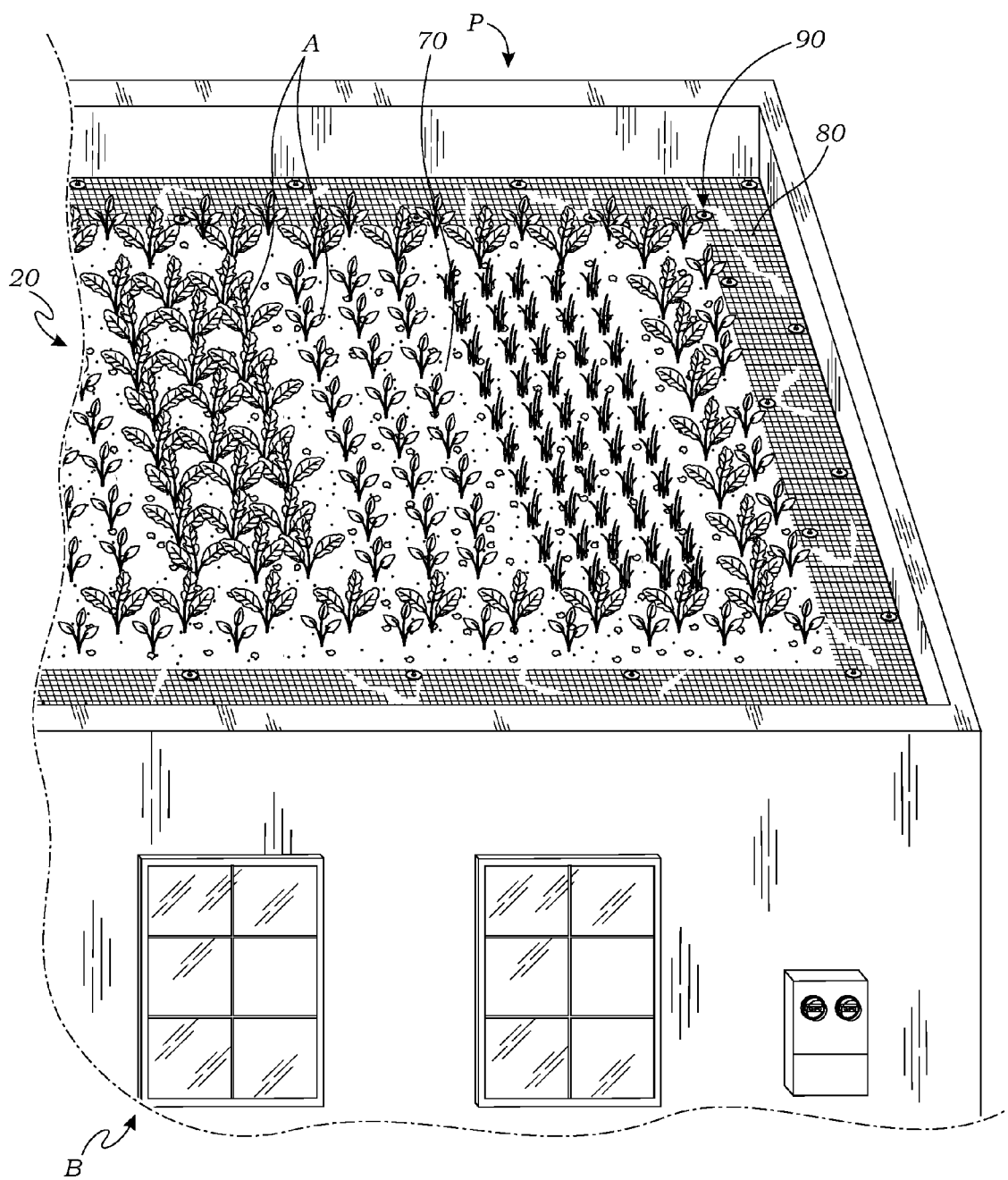
FIG. 15 is a perspective view of a sixteenth exemplary embodiment of a protected membrane roof system according to aspects of the present invention.

In still further alternative exemplary embodiments, referring now to FIGS. 13A and 13B, there are shown cross-sectional schematic views of a protected membrane roof system 20 according to aspects of the present invention again configured as a "garden roof" with soil ballast 80 similar to the exemplary embodiment of FIG. 10, only here comprising as part of the ballast layer an arrangement of one or more growth media grids 82 (special pavers with voids) for retaining the soil 70 and to help ballast the roof and any other plants A placed within the soil 70. Such growth media grids 82 may be interlocking or abutting in the region of the vertical grid walls 84 in a manner known or developed in the art. In a bit more detail, then, in the exemplary arrangement of the system 20 illustrated in FIG. 13A, from bottom to top, the system 20 includes a waterproofing membrane 50 installed over the roof decking R, the optional protection course layer 64 and root barrier layer 66, at least one upper insulation board 30, a drainage retention layer 60, a filter fabric layer 62, the soil ballast 70 contained within a layer of growth media grids 82, and a netting 80 over the soil ballast 70 and grids 82 as anchored by one or fasteners 90 seated within or beneath the one or more upper insulation boards 30. Here, the fastener assemblies 90, and particularly the rods 94 thereof, are shown as abutting or being proximate to the vertical walls 84 of the grids 82, with the fastener caps 98 then seating thereover to retain the netting 80 in position essentially over the soil 70 along the tops of the grids 82, or the grid walls 84 specifically. Whether or not the grids 82 are formed with bottom walls (not shown) and whether or not such walls are solid or perforated or otherwise formed with holes or openings, such may be formed as necessary and the fastener rod 94 otherwise passed up through the grids 82 and soil 70 to as to be capped and retain or anchor the netting 80 has herein described. Similarly, as shown in FIG. 13B, a "garden roof" system 20 analogous to that of FIG. 13A is shown, except that here the fasteners 90 simply come up through an intermediate location within the growth media grids 82 and there fasten to or anchor over the netting 80. Either way, it will be appreciated by those skilled in the art that the netting 80 being anchored over the soil ballast layer 80 at intermittent locations serves to secure such ballast material against wind uplift and scatter, as further assisted by incorporation of the grids 82 and effectively tying both the grids 82 and netting 80 to the insulation boards 30 beneath through spaced-apart fasteners 90. It will be further appreciated that plants A then planted in or growing out of the soil 80 and up through the netting 80 further serve to anchor and tie the whole system 20 together as somewhat of a monolithic whole. Once more, those skilled in the art will appreciate that a variety of other arrangements, including adding or removing or rearranging layers within the system 20 and employing various grids 82 or other such devices in conjunction with the soil 70 are possible according to aspects of the present invention without departing from its spirit and scope, such that the illustrated embodiments are to be understood as exemplary and non-limiting. By way of further illustration and not limitation, exemplary growth media grids 82 as may be employed in a roof system 20 according to aspects of the present invention, including those embodiments illustrated schematically in FIGS. 13A and 13B, may be those provided by EcoGrid in the U.K. under the name EcoGrid or provided by Hastings Architectural Products under the name Checker Block®. Also illustrative are the plants A shown as grass or other such growth or groundcover, while it will be appreciated that a virtually infinite variety of plants A may be planted or grown in the soil ballast 70 depending on a number of factors, including but not limited to the climate and the soil depth.

Figure 16A:
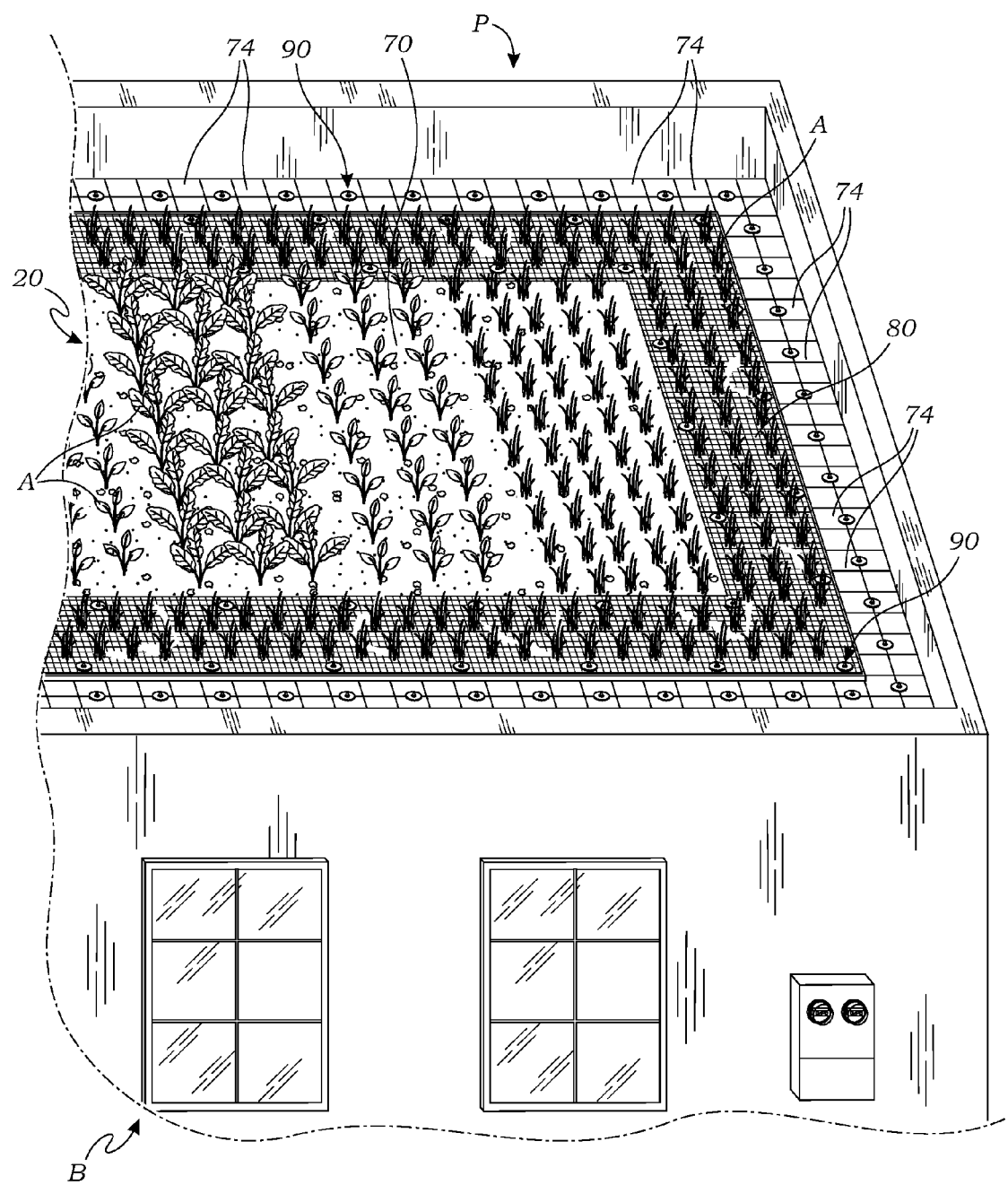
FIG. 16A is a perspective view of a seventeenth exemplary embodiment of a protected membrane roof system according to aspects of the present invention.
Figure 16B:
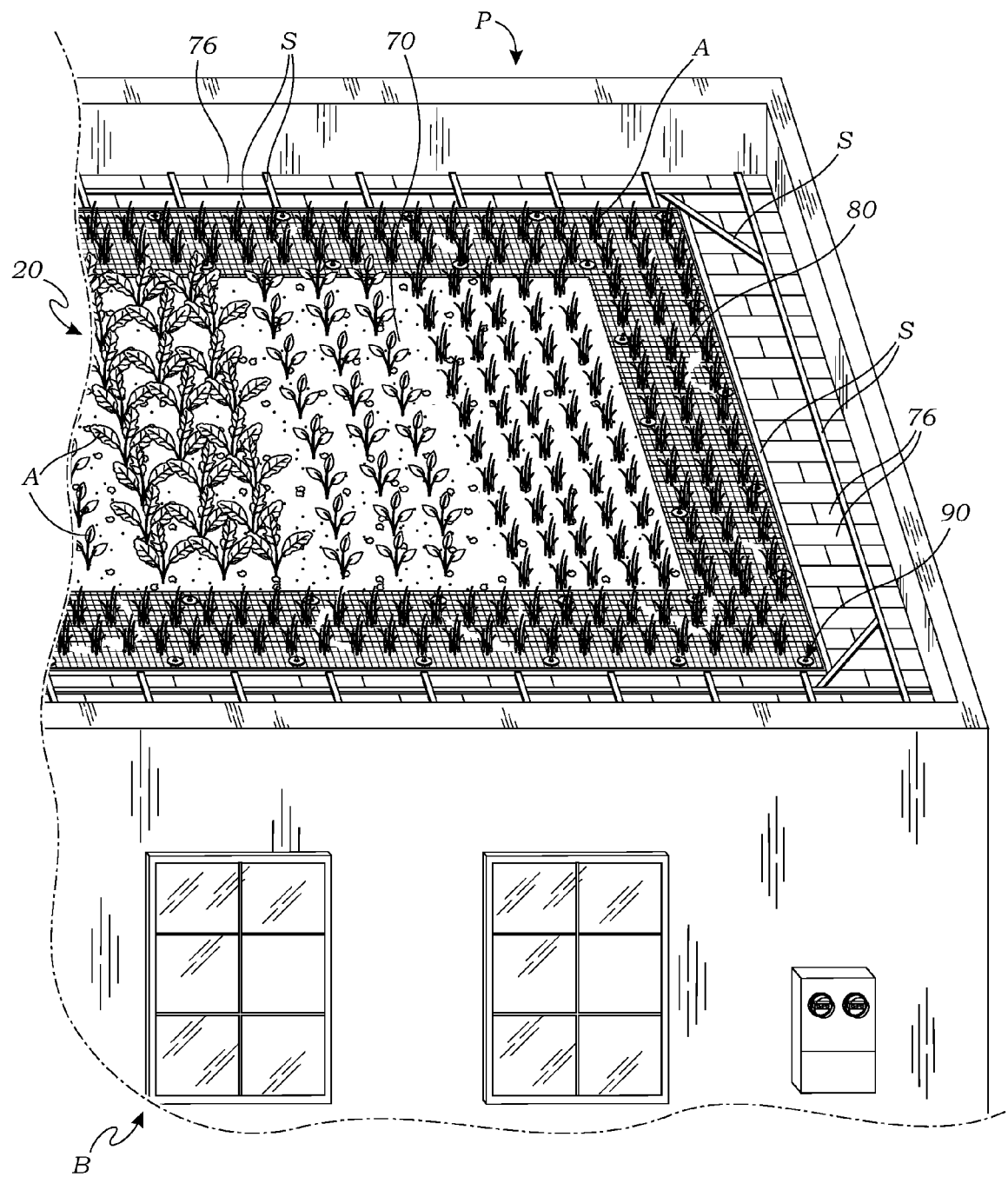
FIG. 16B is a perspective view of an eighteenth exemplary embodiment of a protected membrane roof system according to aspects of the present invention.
Figure 16C:
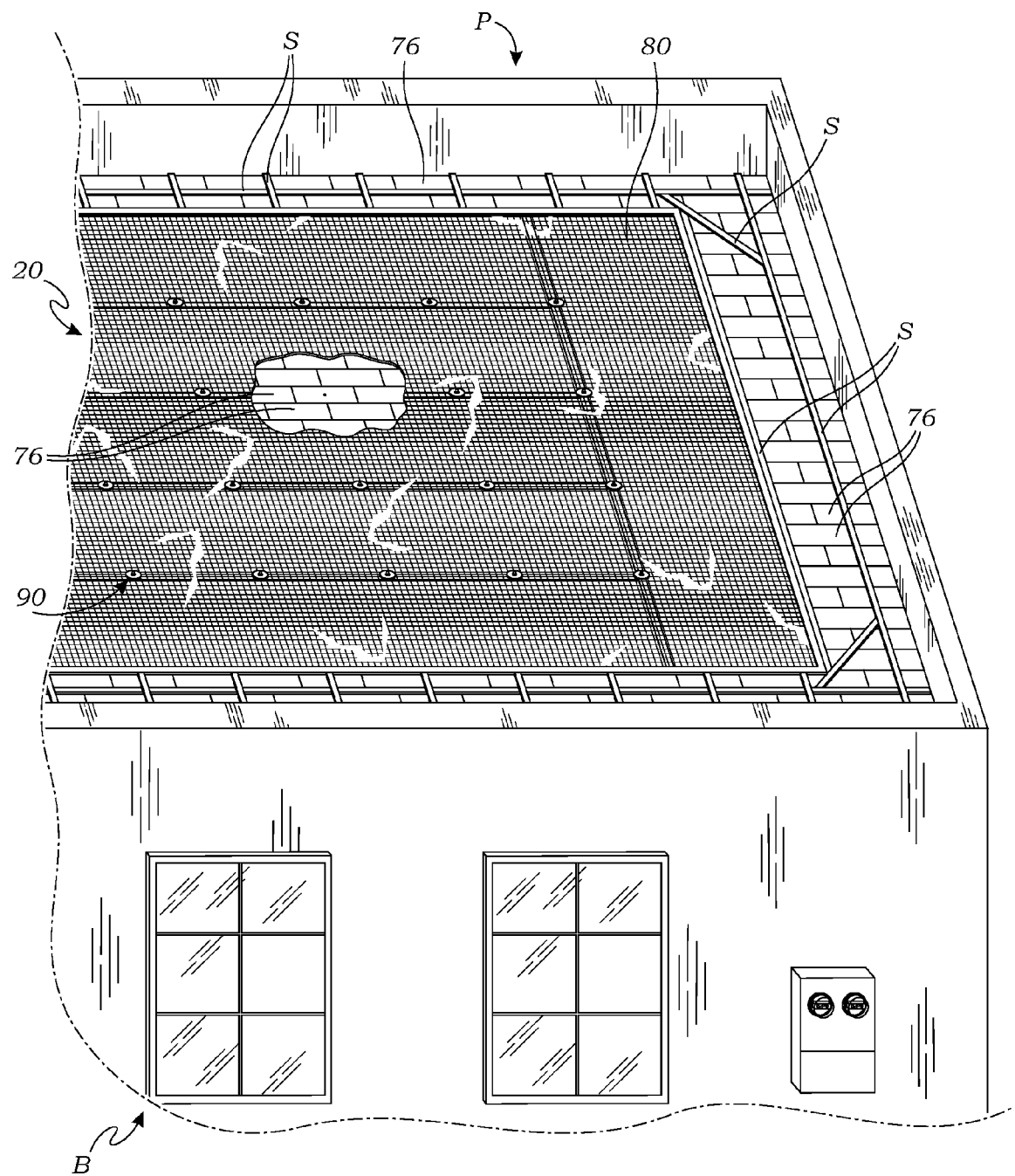
FIG. 16C is a perspective view of a nineteenth exemplary embodiment of a protected membrane roof system according to aspects of the present invention.

Turning next to FIGS. 14-16C there are shown a variety of further exemplary embodiments of protected membrane roof systems 20 according to aspects of the present invention, here illustrated as perspective views analogous to FIG. 1. As a threshold matter, while a particular exemplary flat-roof building B with a parapet P of a particular arrangement is depicted, it will be appreciated that a roof system 20 according to aspects of the invention, including but not limited to those exemplary embodiments shown and described herein, may be employed in virtually any building or roof context, and so is not in any way limited to that illustrated. First, in FIG. 14, there is shown an exemplary "garden roof" system 20 as installed on a building B, with such system 20 spanning substantially the entire roof or region bounded by the parapet P, though it will be appreciated in any such context that there may be HVAC and other equipment (not shown) on the roof around which the system 20 would be installed. As illustrated, a perimeter restraint for the soil ballast 70 is provided as by having a width or section of netting 80 around the border of the roof closest to the parapet P, with no netting in the middle of the roof, which is simply exposed garden roof (soil and plants/vegetation). Here, then, substantially the entire roof system 20 is "garden roof," with plants A both throughout the middle of the roof as coming up from the soil 70 and around the perimeter of the roof as coming up through the netting 80, again with only the perimeter being further restrained with the netting 80 and related below surface anchoring system or spaced-apart fasteners 90. Here, the fasteners 90 are shown as being spaced relatively further apart, as compared with the spacing of FIG. 1, essentially along the outside and inside edges of the netting 80. It will once again be appreciated that the anchoring fasteners 90 within the netting 80 along with the plants A would thus cooperate in securing the perimeter of the roof system 20 and preventing or reducing uplift or scatter of the soil ballast 70. More generally, those skilled in the art will appreciate that a variety of perimeter restraint systems and methods, now known or later developed, may be employed, in a variety of configurations, as will be further appreciated with reference to the alternative exemplary embodiments of FIGS. 15 and 16A-16C, including but not limited to the use of netting 80 or not, the use of other ballast materials as the perimeter restraint, and/or the use of other perimeter restraint materials such as strapping S (FIGS. 16B and 16C). It will also be appreciated that, as shown, a variety of plants A suitable to the application and context may be incorporated in the roof system 20, such that the appearance, number, and arrangement (location and spacing) of the plants A depicted in any and all of the figures are to be understood as merely illustrative and non-limiting. Similarly, referring to FIG. 15, there is shown an alternative exemplary embodiment of a "garden roof" system 20 again with a perimeter restraint including netting 80 with anchoring fasteners 90 located closest to the parapet P, though here shown as being relatively narrower than the perimeter netting 80 of FIG. 14. Moreover, it will be appreciated that while a garden roof region with soil ballast 70 and plants A is shown in the middle area of the roof bound by the perimeter netting 80, in the alternative embodiment of FIG. 15 the perimeter, rather than also being "garden roof" with soil ballast 70, may be configured having some other ballast material underneath the netting 80, such as a stone ballast 72 as illustrated in FIG. 4 (again, in any such systems 20, the type, number, arrangement, and thickness of any related layers, including but not limited to the number and characteristics of any insulation boards 30, 40, are illustrative and non-limiting, as a variety of such configurations are possible according to aspects of the present invention). It will be appreciated that with any such distinct perimeter restraint, such as here where a heavier stone ballast 72 is used relative to the interior soil ballast 70, wind uplift resistance is thereby increased, with the size and arrangement of the netting 80 and the spacing or density of the fasteners 90 further affecting performance. More generally, as illustrated, in roof systems 20 according to aspects of the present invention it will be appreciated that multiple kinds of ballast materials may be employed in a single system 20 to suit a particular context. Those skilled in the art will thus appreciate that a variety of such features and combinations are possible according to aspects of the present invention in seeking to optimize the roof system 20 for a particular commercial application, whether from a cost stand-point, code-compliance stand-point, or greenspace or other environmental stand-point, taking into consideration such factors as building design and weight or loading limits, type and amount of ballast to be used and related insulation board(s) and other layers in the system, parapet configuration, typical climate and wind conditions, installation and maintenance costs, etc., such that any of the embodiments illustrated are again to be understood as illustrative and non-limiting.

Figure 11B:
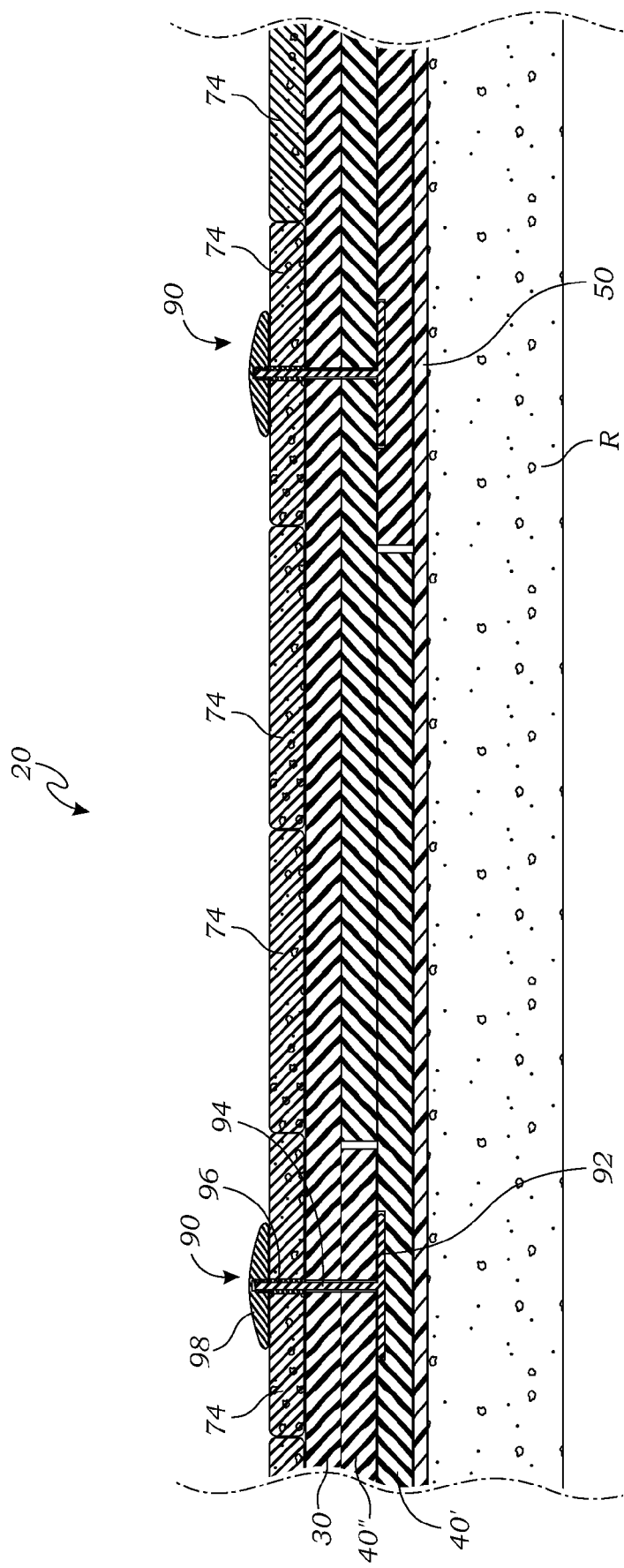
FIG. 11B is a cross-sectional schematic analogous to FIG. 2 of an eighth exemplary embodiment.
Figure 11C:
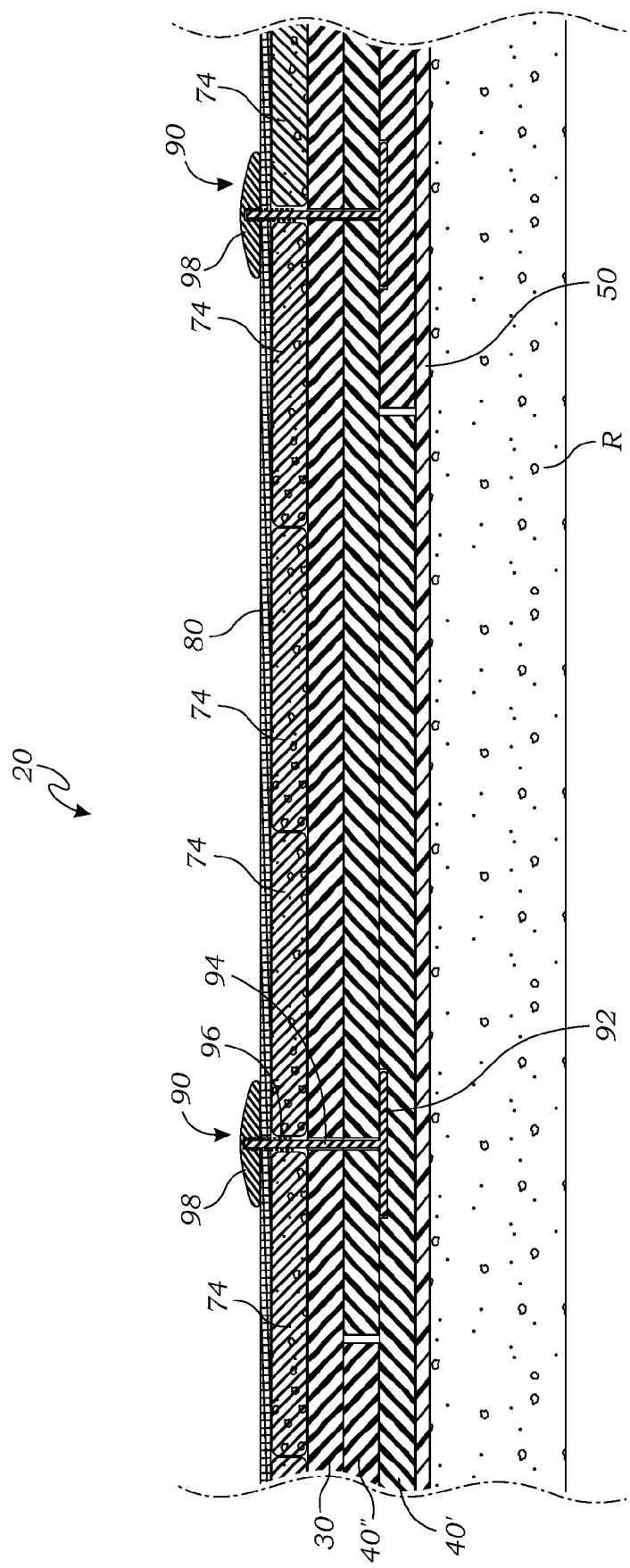
FIG. 11C is a cross-sectional schematic analogous to FIG. 2 of a ninth exemplary embodiment.
Figure 11D:
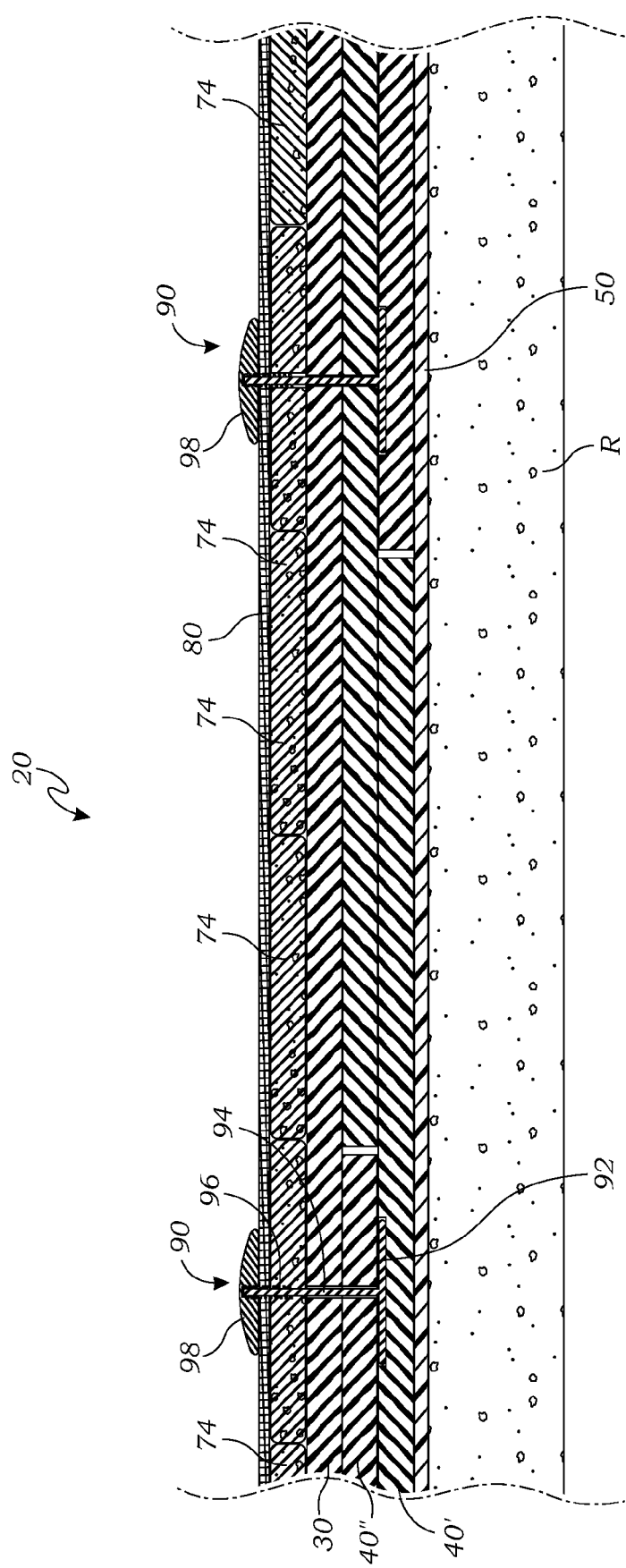
FIG. 11D is a cross-sectional schematic analogous to FIG. 2 of a tenth exemplary embodiment.

Referring particularly to FIGS. 16A-16C, then, there are shown still further exemplary embodiments of protected membrane roof systems 20 according to aspects of the present invention, here having a perimeter of pavers 74 (FIG. 16A) or panels 76 (FIGS. 16B or 16C) closest to the parapet P, with the balance of the roof system 20 then inset from such perimeter restraint region. First, in FIG. 16A, there is shown a "garden roof" that is similar to that of FIG. 14, with a perimeter netting 80 region anchored with spaced-apart fasteners 90 and having plants A therein bounding a central region of soil ballast 70 also having plants A, except that here the "garden roof" portion of the system 20 does not extend fully to the perimeter, or all the way to the parapet P of the building B, but instead has a further perimeter restraint comprised here in the exemplary embodiment of two rows of pavers 74 anchored in the underlying insulation boards as by using spaced-apart fasteners 90, though it will be appreciated that one row of pavers 74 or three or more rows may also be employed depending on a number of factors, with such pavers and rows being of any desired geometry and potentially even varying around the perimeter. That is, it will be appreciated that in the exemplary roof system 20 of FIG. 16A, there is a first perimeter restraint system that may be characterized as a paver ballast section such as shown in FIGS. 11A and 11B (since no netting is shown as being employed over the pavers 74, though it will be appreciated that the netting 80 could instead extend all the way to the parapet P and so cover the perimeter portion of the "garden roof" region where a soil ballast 70 is employed (both as exposed centrally and underneath the netting 80) and the pavers 74, in which case the perimeter paver ballast section could be represented by the exemplary arrangements shown in FIGS. 6 and 11C and 11D, it again being appreciated that a variety of insulation board and other layers may be employed beneath the ballast beyond those shown and described). Moving inwardly there is shown a second, inset perimeter restraint again configured here as a garden roof perimeter restrained as by the netting 80 and spaced-apart fasteners 90, such as illustrated in FIG. 10 (though no plants being shown there) or FIGS. 13A and 13B, recognizing that in any such "garden roof" arrangement soil 70 alone may be employed or growth media grids 82 into which the soil 70 and plants A are placed, or any other such arrangement. It will be appreciated that the widths and arrangements of such perimeter restraint regions may vary without departing from the spirit and scope of the invention, with other combinations also possible. For example, the interior netting-covered perimeter restraint of FIG. 16A shown as an extension of the central "garden roof" region with soil ballast 70 and plants A may instead comprise stone ballast 72 as shown and described in connection with the perimeter restraint illustrated in FIG. 15 or any other such ballast material now known or later developed. Once more, such ballast materials and related arrangements of their regions, in terms of their geometries and characteristics, may be combined in a variety of ways according to aspects of the present invention beyond those shown and described, such exemplary embodiments then being understood as illustrative and non-limiting. Relatedly, once more, the fastener spacing or density may also vary widely depending on the context. In FIG. 16B, then, there is shown yet another "garden roof" arrangement of the system 20 similar to that of FIG. 16A, particularly as to the central region with the soil ballast 70 and perimeter netting 80 and spaced-apart fasteners 90 with plants A throughout, though here having a different outer perimeter restraint closest to the parapet P configured as a layer of rectangular-shaped insulation panels 76 further restrained with strapping S. As for the insulation panels 76 themselves, they may here cover just the perimeter portion of the roof and, whether or not interlocking or including any other fastening or restraint system as herein described, may also include a system of strapping S, such as metal strips laying over such panels 76 lengthwise and being staked to each other and/or to the parapet P or other roof structure to effectively "tie down" the ballast material here as perimeter insulation panels 76. By way of illustration and not limitation, such strapping S may be configured or arranged as supplied and/or specified by T Clear Corporation in Hamilton, Ohio as its "System 1", "System 2" or "System 3" "Wind Designs & Securement for T. Clear Protected Membrane Roof Systems Using Lightguard® or Heavyguard® Ballasts," though it will be appreciated that a variety of perimeter restraint systems for wind design or otherwise from a variety of sources may be employed in conjunction with aspects of the present invention, it being appreciated that any such third-party restraint system is thereby enhanced by virtue of the added or improved wind uplift resistance characteristics of roof systems 20 according to aspects of the present invention, with such perimeter restraint systems able to be reduced in cost and complexity for the substantially the same performance or to perform relatively greater at the same cost and complexity. Accordingly, once more, it will be appreciated that a variety of arrangements and combinations of features according to aspects of the present invention are possible without departing from its spirit and scope. Similarly, as shown in FIG. 16C, effectively the same perimeter restraint arrangement with ballast insulation panels 76 may be employed as illustrated, including restraint strapping S, only here with the central portion of the roof also comprising such insulation panels 76 as the ballast, rather than a "garden roof" area with soil ballast 70, as seen via the central cut-away area in FIG. 16C, such central panels 76 further shown as being covered by a netting 80 anchored by spaced-apart fasteners 90 seated within the at least one insulation board 30 as shown by way of example in FIGS. 7 and 12B (since netting 80 is employed, though in a further alternative embodiment netting may not be employed and the panels 76 still anchored via fasteners 90 as illustrated in FIG. 12A), again, any combination of such features and layers, including but not limited to the number and arrangement of any underlying insulation boards and thus what board(s) the fasteners 90 are anchored in, are possible according to aspects of the present invention without departing from its spirit and scope. Once more, any fastener spacing or density is also possible depending on the context as explained herein. In the exemplary embodiment of FIG. 16C, though again not being to scale or to be taken as such or as conveying any dimensional information, by way of illustration and not limitation, the fasteners 90 throughout the netting 80 in the central portion of the roof may be positioned as one per "square," or one per each one hundred square feet (100 sq. ft.) or ten foot by ten foot (10'×10') area, putting such fasteners 90 essentially at a spacing of ten feet (10') on center in both directions, though again it will be appreciated that a virtually infinite range of spacings or fastener densities may be employed. Indeed, by way of further illustration and not limitation, in another arrangement a twenty foot by twenty foot (20'×20') area encompassing four hundred square feet (400 sq. ft.) is considered the applicable area, with one fastener 90 at each corner of that 20'×20' area yielding four fasteners per 400 sq. ft. or one for every 100 sq. ft. (or one per "square"), here with the fasteners 90 thus at a spacing of twenty feet (20') on center in both directions. Moreover, the spacing may be uniform throughout all or part of the roof or may be at varied spacing, such as having closer spacing or greater fastener density at the perimeter restraint areas or along netting seams, for example. More generally, it will be appreciated that where the netting 80 meets any perimeter restraint system, whether employing pavers 74 (FIGS. 1 and 16A) or insulation panels 76 (FIGS. 16B and 16C), alone or in any combination and at any width or other configuration and with or without any strapping S or other perimeter restraint hardware, such netting 80 may be tucked in or staked or otherwise secured under such perimeter restraint system to further anchor the netting 80 along with any fasteners 90 employed.

Figure 17A:
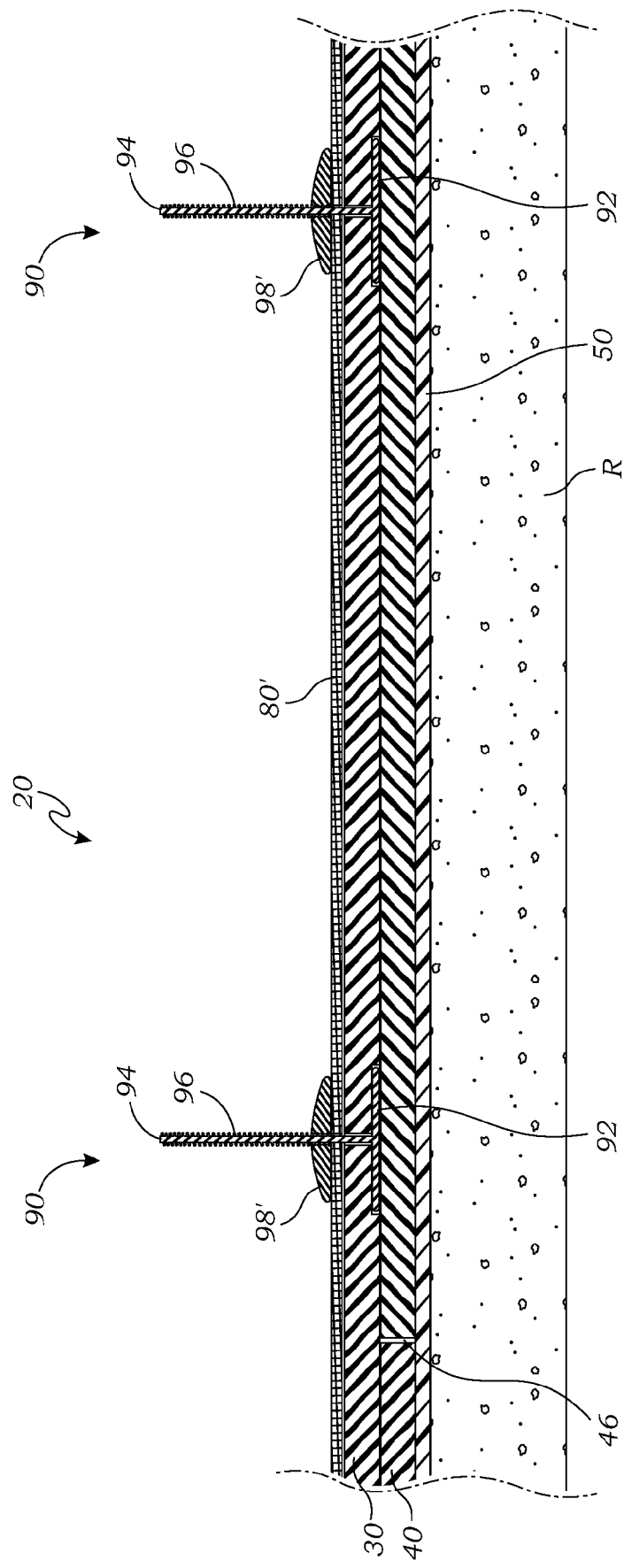
FIG. 17A is a cross-sectional schematic analogous to FIG. 2 of a twentieth exemplary embodiment in a first operational mode.
Figure 17B:
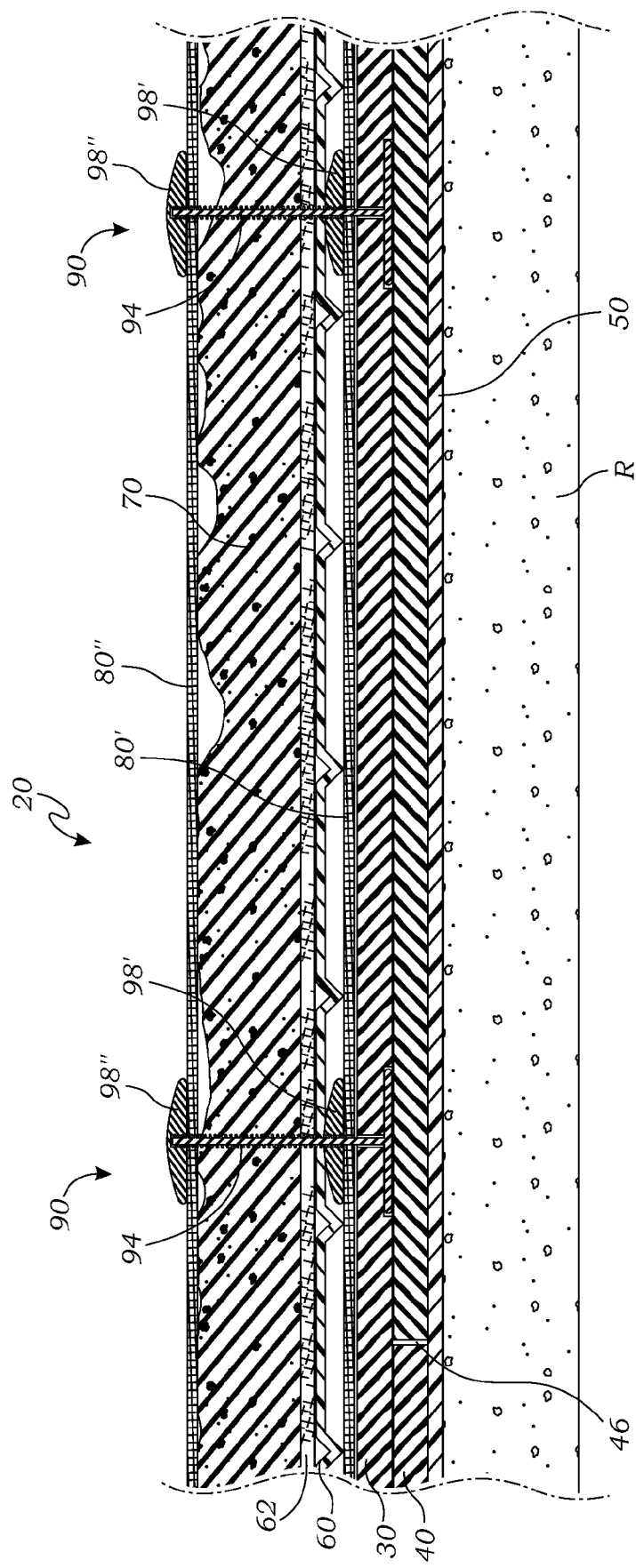
FIG. 17B is a cross-sectional schematic of the exemplary embodiment of FIG. 17A in a second operational mode.

Finally, referring to FIGS. 17A and 17B there is shown yet another alternative exemplary embodiment protected membrane roof system 20 according to aspects of the present invention, here illustrated as being installed in two stages or steps or operational modes. First, as illustrated in FIG. 17A, an initial or immediate step or mode entails installing one or more layers of insulation boards 30, 40 over the waterproofing membrane 50 as called for in the commercial context, again based on a number of variables, here two such boards 30, 40 being illustrated. Fastener assemblies 90 are spaced along and installed through holes formed in the upper insulation board 30 as by having the base 92 of each fastener 90 positioned beneath and adjacent to the upper insulation board 30 and the rods 94 extend up through the upper boards 30. Once more, actual fastener spacing can vary, such that the illustrated embodiment of FIGS. 17A and 17B is to be understood as exemplary and non-limiting and not taken literally or to scale. A first netting 80' is laid or stretched across the upper insulation boards 30, whether before or after the fasteners 90 are placed, with first caps 98' then threadably or otherwise secured on or about the rods 94 so as to secure the first netting 80' over the layer of upper insulation boards 30. Where the first cap 98' is to be threadably engaged with the rod 94, it will be appreciated that the threaded portion 96 of the rod 94 may thus extend substantially along its entire length, or at least along a greater and/or lower section of its length; it will also be appreciated that such first cap 98' is to have a through-hole allowing for complete passage therethrough of the rod 94, while the second cap 98" as described further below and consistent with the caps 98 shown generally in the other exemplary embodiments need not necessarily have a through-hole, though still might, both for the sake of convenience in terms of inventorying only kind of cap 98 and for purposes of accommodating various kinds and thicknesses of roof systems 20, as particularly dictated by the number and kind(s) of insulation boards 30, 40 employed and the kind and thickness of ballast material employed, with the rods 94 being made sufficiently long to accommodate such varied systems 20 and then being trimmed or cut to length as needed. More generally, it will be appreciated that any such fastener assemblies 90 and related component designs now known or later developed may be employed in the roof systems 20 according to aspects of the present invention without departing from its spirit and scope. It will be further appreciated that in any such arrangement as illustrated in FIG. 17A the fasteners 90 and netting 80 thus cooperate to further secure the upper insulation boards 30 in place as by effectively tying them together as a collective system having an aggregate weight and wind uplift resistance. This being a relatively temporary arrangement, such as to allow time for inspection and/or the "permanent" ballasting step, the fastener rods 94 are thus left at their full length rather than being trimmed or cut off. At this stage, other temporary ballasting measures can be taken as appropriate, such as placing sand bags (not shown) selectively about the roof system 20, which would then be removed when the final ballast system is applied. Accordingly, as then shown in FIG. 17B, when all inspections or other pre-ballast activities have been completed and the roof system 20 is to be finished, the additional layers, here as illustrated in the "garden roof" context, may be applied over the previously-installed membrane 50, one or more insulation boards 30, 40, first netting 80', and fastener assemblies 90—namely, continuing from bottom to top, a drainage retention layer 60, a filter fabric layer 62, soil ballast 70 (again, with or without any growth media grids 82 (FIGS. 13A and 13B)), and a second netting 80" capped and held in place by upper or second caps 98" placed over the upper or second netting 80" and installed on the respective fastener rods 94, thereby completing the roof system 20, essentially in two steps performed some time apart while at all times satisfactorily securing or ballasting what layers of the roof system 20 have to that point been installed. Thus, it will be appreciated by those skilled in the art that the use of fasteners 90 anchored in one or more layers of insulation boards 30, 40 according to aspects of the present invention provides a convenient and effective multi-stage roof installation system as shown and described herein. Once more, it will be appreciated that a variety of other arrangements are possible without departing from the spirit and scope of the invention, including utilizing different types and numbers of insulation boards and other layers and different types of ballast materials, such as stone 72, pavers 74, or panels 76, such that the exemplary embodiments shown and described are to be understood as illustrative and non-limiting.

To summarize, regarding the exemplary embodiments of the present invention as shown and described herein, it will be appreciated that a protected membrane roof system is disclosed and configured for effectively anchoring a netting positioned over a ballast material and/or a ballast material itself beneath an upper insulation board positioned beneath the ballast material. Because the principles of the invention may be practiced in a number of configurations beyond those shown and described, it is to be understood that the invention is not in any way limited by the exemplary embodiments, but is instead able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A protected membrane roof system for installation on a roof decking, comprising:
    an upper insulation board having an upwardly-facing upper board top surface and an opposite downwardly-facing upper board bottom surface, the upper insulation board positioned over and in close proximity to the roof decking;
    a ballast material positioned over and in close proximity to the upper insulation board;
    at least one fastener assembly comprising:
        a base seated substantially adjacent the upper board bottom surface;
        a rod extending substantially vertically from the base of sufficient size so as to extend through a through-hole of the upper insulation board and through the ballast material; and
        a cap engaged with the rod above the ballast material; and
    a waterproof membrane positioned over and in close proximity to the roof decking beneath and in close proximity to the upper insulation board, the at least one fastener assembly neither penetrating nor attaching to the membrane;
        whereby the wind uplift resistance of the protected membrane roof system is improved and scour of the ballast material is reduced by effectively anchoring the ballast material beneath the upper insulation board positioned beneath the ballast material.

2. The system of claim 1 further comprising a netting positioned over at least a portion of the ballast material, the at least one fastener assembly configured to selectively engage the netting, whereby the netting is anchored beneath the upper insulation board positioned beneath the ballast material without compromising the waterproof membrane.

3. The system of claim 2 wherein the netting and the ballast material extend to a perimeter of the roof decking.

4. The system of claim 1 further comprising a protection course layer between the upper insulation board and the waterproof membrane, whereby the base of the fastener assembly is separated from the waterproof membrane by at least the protection course layer.

5. The system of claim 4 further comprising a root barrier layer between the upper insulation board and the protection course layer.

6. The system of claim 1 wherein the ballast material is soil.

7. The system of claim 6 further comprising a semi-rigid drainage retention layer between the upper insulation board and the soil ballast material.

8. The system of claim 7 further comprising a filter fabric layer between the drainage retention layer and the soil ballast material.

9. The system of claim 6 further comprising a plurality of growth media grids containing at least a portion of the soil ballast material and positioned above and in close proximity to the upper insulation board, the plurality of growth media grids providing further perimeter restraint and wind uplift resistance of the protected membrane roof system.

10. The system of claim 9 wherein the at least one fastener assembly passes through at least one of the plurality of growth media grids.

11. The system of claim 10 further comprising a netting positioned over at least the plurality of growth media grids containing the soil ballast material, the at least one fastener assembly configured to selectively engage the netting, whereby the netting is anchored beneath the upper insulation board positioned beneath the plurality of growth media grids containing the soil ballast material.

12. The system of claim 9 further comprising a semi-rigid drainage retention layer between the upper insulation board and the plurality of growth media grids containing the soil ballast material.

13. The system of claim 12 further comprising a filter fabric layer between the drainage retention layer and the plurality of growth media grids containing the soil ballast material, the growth media grids being immediately adjacent to the filter fabric layer.

14. The system of claim 1 further comprising a plurality of pavers or insulation panels adjacent to the ballast material and the upper insulation board, the pavers or insulation panels providing further perimeter restraint and wind uplift resistance of the protected membrane roof system.

15. The system of claim 14 wherein the at least one fastener assembly passes through at least one of the pavers or insulation panels.

16. The system of claim 14 further comprising a netting positioned over at least a portion of the ballast material, the at least one fastener assembly configured to selectively engage the netting, whereby the netting is anchored beneath the upper insulation board positioned beneath the ballast material and the netting is further anchored about its perimeter by the plurality of pavers or insulation panels.

17. The system of claim 1 wherein the ballast material is insulation panels.

18. The system of claim 17 wherein the insulation panels are concrete-faced foam.

* * * * *